US008434637B2

(12) United States Patent
Mita et al.

(10) Patent No.: US 8,434,637 B2
(45) Date of Patent: May 7, 2013

(54) PACKAGING BAG

(75) Inventors: Kozo Mita, Tokyo (JP); Yoshitaka Hamada, Tokyo (JP); Atsuko Takahagi, Tokyo (JP); Shin Yamada, Tokyo (JP)

(73) Assignee: Dai Nippon Printing Co., Ltd, Tokyo (JP)

( * ) Notice: Subject to any disclaimer, the term of this patent is extended or adjusted under 35 U.S.C. 154(b) by 1523 days.

(21) Appl. No.: 11/887,825

(22) PCT Filed: Apr. 4, 2006

(86) PCT No.: PCT/JP2006/307144
§ 371 (c)(1),
(2), (4) Date: Oct. 4, 2007

(87) PCT Pub. No.: WO2006/107048
PCT Pub. Date: Oct. 12, 2006

(65) Prior Publication Data
US 2009/0035424 A1 Feb. 5, 2009

(30) Foreign Application Priority Data
Apr. 4, 2005 (JP) ................................. 2005-107728

(51) Int. Cl.
*B65D 25/16* (2006.01)
(52) U.S. Cl.
USPC ...................................... 220/495.03; 383/66
(58) Field of Classification Search ............ 220/495.03; 383/66
See application file for complete search history.

(56) References Cited

U.S. PATENT DOCUMENTS

| 4,367,842 A * | 1/1983 | Rausing ........................ 383/66 |
| 4,623,587 A * | 11/1986 | Ito et al. ...................... 428/335 |
| 4,810,844 A * | 3/1989 | Anderson .................... 219/727 |
| 6,117,538 A * | 9/2000 | Hirata et al. ............... 428/315.9 |
| 6,596,355 B1 * | 7/2003 | Mita et al. .................. 428/35.2 |
| 2003/0123758 A1 * | 7/2003 | Mita et al. ..................... 383/38 |
| 2003/0187113 A1 * | 10/2003 | Shiho et al. .................. 524/261 |

FOREIGN PATENT DOCUMENTS

| CA | 2 533 065 | 2/2005 |
| JP | 10-72070 | 3/1998 |
| JP | 10-211972 | 8/1998 |
| JP | 2000-72187 | 3/2000 |
| JP | 2000-118575 | 4/2000 |

(Continued)

OTHER PUBLICATIONS

European Search Report—EP 06 73 1092—Sep. 22, 2010.

*Primary Examiner* — J. Gregory Pickett
*Assistant Examiner* — Ernesto Grano
(74) *Attorney, Agent, or Firm* — Young & Thompson

(57) ABSTRACT

A packaging bag for microwave oven heating, is manufactured by using a complex film at least one side of which comprises a sealant layer, folding the complex film or placing the complex films one upon another so as to encounter the sealant layers to each other, sealing the peripheral of the overlapped complex films by a main seal part to form a sealed bag, and providing in the bag a region which is isolated from a space for storing contents by a steam port seal part. The steam port seal part surrounds a steam easy permeable element. The lamination strength between the layers of the complex film in hot condition is not less than 1.5 N/15 mm in width, and the seal strength at least at the steam port seal part in hot condition is not more than 28 N/15 mm in width.

9 Claims, 8 Drawing Sheets

FOREIGN PATENT DOCUMENTS

| | | |
|---|---|---|
| JP | 2000-168851 | 6/2000 |
| JP | 2000-327046 A | 11/2000 |
| JP | 2003-155075 A | 5/2003 |
| JP | 2003-182779 | 7/2003 |
| JP | 2005-59265 A | 3/2005 |
| JP | 2005-075426 | 3/2005 |

* cited by examiner (A)

(B)

(A)

(B)

(A)

(B)

(C)

PACKAGING BAG

FIELD OF THE INVENTION

This invention relates to a packaging bag for seal-packaging of food, etc., capable of microwave oven heating. Particularly, this invention relates to a packaging bag which can be heated in its sealed state for retaining food, etc., therein, with a microwave oven.

RELATED ART

In order to eat the food which is seal-packaged into the packaging bag or the like, there may be cases where heating or heat-cooking by the microwave oven is appreciated or needed. In such cases, the internal pressure of the packaging system will be built up with the steam generated by the heating as long as the packaging is kept as tight seal condition. As the result, the packaging bag explodes, and contents in the bag are scattered over inside of microwave oven. Such problem is well known in the art and various methods for solving the problem have been proposed.

For example, (1) a method where cut-off or boring is performed in advance of heating has been proposed. For instance, in Patent Literature 1, a packaging bag which has a notch capable of breaking the seal condition of the bag has been proposed, wherein the notch is formed at a wing-like part which is branched from a main body of the packaging bag and has an inner space communicated with the inner space of main body. In Patent Literature 2, a packaging bag which has a prearranging portion for steam release port being arranged from a breakable notch and in a line with another prearranging portion for contents pouring port has been proposed.

Further, (2) another method has been proposed where an easy breakable portion which can easily opened by the internal pressure enhanced by heating is provided in the packaging bag. For instance, in Patent Literatures 3 and 4, it is disclosed that a thin film tape of easy peel-off type is used for a part of opening of the packaging bag and that the seal by the tape part concerned is released by the internal pressure of pouch. In Patent Literature 5, a weak seal part is formed in a part of seal portion at a bottom of bag, and the weak seal part concerned is released by the internal pressure of the bag.

However, in the above mentioned case (1), the work of making a cut or hole in advance of heating is troublesome. Furthermore, to forget the work before heating is liable to occur. In that case, the bag will explode, and it is so dangerous.

Since in the above mentioned case (2), the seal strength of the packaging back is insufficient, there is a possibility of seal-breakage during transportation according to the kind of contents and the condition of transportation.

From the view point of above mentioned problems, we, the inventors have proposed (3) a packaging bag which provides with a wing part, a point-seal part formed in the wing part, and at least one of steam permeable means located within the point-seal part.

As above mentioned case, when an easy breakable portion which can easily opened by the internal pressure increased by heating is not provided in a portion of the main seal part which seals the periphery of the packaging bag so as to form a closed container, but is provided in a portion independent of the main seal part, it is possible to maintain the seal strength of the packaging back as the container.

However, even when adapting such a construction, if the seal strength at the seal part which closes the easy breakable portion is not in an adequate level, the seal part which was intended to be broken by the internal pressure increased by heating can not be released safely, and the film which forms the packaging bag per se is ruptured. Thus, a fear that the contents in the bag are scattered over inside of microwave oven may arise.

Further, as the packaging bag for foods such as retort food, the one which comprises a complex film in which a metallic layer such as aluminum foil or aluminum vapor deposition film is provided in order to improve the properties such as gas barrier property has been used conventionally. However, it is a known fact that such a packaging bag prepared by using the complex film which includes a metallic layer can not be heated by the microwave oven. Thus, a film of new layer constitution without such a metallic layer has been sought as the packaging bag for microwave oven heating.

Patent Literature 1: Japanese Patent Unexamined Publication HEI 10-72070 (JP H10-72070 A (1998))
Patent Literature 2: Japanese Patent Unexamined Publication 2000-72187 (JP 2000-72187 A)
Patent Literature 3: Japanese Patent Unexamined Publication 2000-118575 (JP 2000-118575 A)
Patent Literature 4: Japanese Patent No. 3006528
Patent Literature 5: Japanese Patent Unexamined Publication 2000-168851 (JP 2000-168851 A)
Patent Literature 6: Japanese Patent Unexamined Publication 2003-182779 (JP 2003-182779 A)

DISCLOSURE OF THE INVENTION

Problems to be Solved by the Invention

Therefore, this invention aims to provide a packaging bag which can solve the above mentioned problems in the prior arts. Further, this invention aims to provide a packaging bag for microwave oven heating, which can prevent the burst of the bag by steam, generated by heating, and can release gently the generated steam to the outside even when the closed seal system is not released before microwave oven heating of foods as the contents stored and sealed in the bag.

Means for Solving the Problems

After we, the inventors have make a diligent study for solving the above mentioned problems, we have found that, in the packaging bag which is manufactured by using a complex film at least one side of which comprises a sealant layer, folding the complex film or placing the complex films one upon another so as to encounter the sealant layers to each other, sealing the peripheral of the overlapped complex films by a main seal part so as to form a sealed bag, and preparing in the bag a region which is isolated from a space for storing contents by a steam port seal part, wherein the steam port seal part is formed consecutively from the main seal part or is formed as a part independent of the main seal part, and wherein the steam port seal part surrounds an steam easy permeable means; the point whether the steam port seal part is opened normally on heating and thus the interior steam can be successfully released through the steam easy permeable means to the outside, or the packaging bag explodes before the steam port seal part is opened due to occurrence of a certain malfunction in the packaging bag, is depended on the relation between the lamination strength between the layers of the complex film used for the packaging bag and the seal strength between the sealant layers at the steam port seal part under the heated condition (hot condition). Further, we have found that it is possible to provide a packaging bag which can perform the microwave oven heating successively, by adjusting the above mentioned relationship to a proper range, and we have accomplished the present invention in conclusion. Incidentally, although it has been considered in the art that the seal strength at the steam port seal part under the heating condition should be set to an appropriate level, this is the first time that the seal strength under hot condition is defined in a correlation with the lamination strength between the respective layers of the complex film.

Namely, the present invention for solving the above mentioned problem is a packaging bag for microwave oven heating which is manufactured by using a complex film at least one side of which comprises a sealant layer, folding the complex film or placing the complex films one upon another so as to encounter the sealant layers to each other, sealing the peripheral of the overlapped complex films by a main seal part so as to form a sealed bag, and providing in the bag a region which is isolated from a space for storing contents by a steam port seal part, wherein the steam port seal part is formed consecutively from the main seal part or is formed as a part independent of the main seal part, and wherein the steam port seal part surrounds an steam easy permeable means, wherein the lamination strength between the layers of the complex film in hot condition is not less than 1.5 N/15 mm in width, and the seal strength at least at the steam port seal part in hot condition is not more than 28 N/15 mm in width.

The "seal strength in hot condition" used herein is a value which is determined by filling water as contents into the manufactured packaging bag, sealing the bag, subjecting the sealed bag to a retort treatment at 125° C. for 30 minutes, cutting the bag into rectangle samples of 15 mm in width one day after the retort treatment, setting the sample to the chuck of a peeling tester so as to be capable of exfoliating the sealed faces of the sample from each other, heating the sample in this chucked condition, and starting the peel-off test with an elastic stress rate of 300 mm/min. at 30 minutes after the environmental temperature reaches 100° C.

The "lamination strength in hot condition" used herein is a value which is determined by filling water as contents into the manufactured packaging bag, sealing the bag, subjecting the sealed bag to a retort treatment at 125° C. for 30 minutes, cutting the bag into rectangle samples of 15 mm in width one day after the retort treatment, setting the sample to the chuck of a peeling tester so as to be capable of exfoliating the respective layers in the complex film of the sample from each other, heating the sample in this chucked condition, and starting the peel-off test with an elastic stress rate of 50 mm/min. at 30 minutes after the environmental temperature reaches 100° C.

Further, the present invention is directed to the packaging bag wherein the lamination strength between the layers of the complex film in hot condition is in the range of 1.5 N/15 mm in width to 5 N/15 mm in width or at the level of the material destruction of film, and the seal strength at least at the steam port seal part in hot condition is in the range of 5 N/15 mm in width to 28 N/15 mm in width.

Furthermore, the present invention is directed to the packaging bag, wherein the bag is manufactured by using a complex film at least one side of which comprises a sealant layer; preparing a lower member from the complex film, wherein the sealant layer is set as the upper face of the lower member; and also preparing an upper member from the complex film, wherein the upper member have a wing part which is formed by folding a part of the film so that the sealant layer of the film face each other in this part and sealing at least the side edges of the part, and wherein the sealant layer at other parts is set as the lower face of the upper member; putting the upper member on the lower member; sealing the peripheral of the overlapped members by a main seal part so as to form a sealed bag; forming at the centre region of the wing part a point-seal part as the steam port seal part in conjunction with the sealed or folded tail end edge of the wing part; and providing at least one steam easy permeable means within the point seal part.

Still further, the present invention is directed to the packaging bag, wherein control seal parts are prepared almost in parallel with the tail end edge of a wing part and toward the point-seal part from the both side edge seal parts of the wing part.

Moreover, the present invention is directed to the packaging bag which further comprises a casing box for storing the bag, which box has an prearranging portion capable of forming an opening, at the position that the wing part of the packaging bag installed therein is located, wherein the opening is that for pulling out the wing part to the outside of a box.

Further, the present invention is directed to a retort packaging bag for microwave oven heating wherein the bag has a self-standing shape (self-standing pouch).

Further, the present invention is directed to the retort packaging bag for microwave oven heating wherein the complex film comprises at least a sealant layer and a substrate layer, and wherein the substrate layer further has an inorganic oxide vapor deposition layer on the surface faced to the sealant layer.

Furthermore, the present invention is directed to the retort packaging bag for microwave oven heating wherein the inorganic oxide vapor deposition layer further has a gas barrier film on the surface faced to the sealant layer, wherein the gas barrier film is formed by coating a gas barrier composition which comprises at least one alkoxide represented by the following general formula:

$$R^1{}_n M(OR^2)_m$$

(wherein R1 and R2 are mutually independently an organic group having 1-8 carbon atoms, M is a metallic atom, n is an integer of not less than zero, m is an integer of not less than one, and m+n represent the valence of the M.); and a polyvinyl alcohol type resin and/or an ethylene-vinyl alcohol copolymer, and which can polycondense according to the sol-gel method under the presence of a catalyst for the sol-gel method, an acid, water, and an organic solvent; and allowing the composition to polycondense.

In addition, the present invention is directed to the retort packaging bag for microwave oven heating wherein the inorganic oxide vapor deposition layer further has a primer layer on the surface faced to the sealant layer, wherein the primer layer is formed by coating a polyurethane or polyester type resin composition which includes polyurethane or polyester type resin as a main vehicle ingredient and a silane coupling agent at an amount of 0.05-10% by weight based on an amount of 1-30% by weight of the polyurethane or polyester type resin, and drying up the coated film.

Effect of the Invention

According to the present invention, it is possible to provide a retort packaging bag for microwave oven heating which brings neither a fear for the explosion of the bag nor a fear for the leakage of the contents on the microwave oven heating regardless the kind of contents sealed in the bag, and which can release the steam generated at the microwave oven heating certainly and gently, without using particularly an easy peeling film or weaken seal part, or opening the closed system in advance of heating, and thus which can effectively prevent its explosion.

Figure 1:
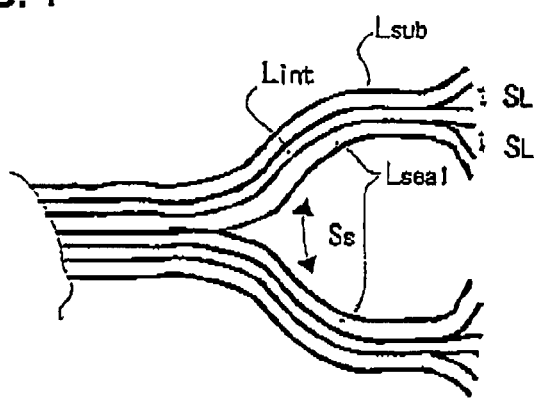
[FIG. 1] is a diagram for illustrating the seal strength in hot condition and the lamination strength in hot condition in the packaging bag for microwave oven heating according to the present invention.

EXPLANATION OF NUMERALS $L_{sub}$ Substrate layer
$L_{seal}$ Sealant layer
$S_S$ Seal strength in hot condition
$S_L$ Lamination strength in hot condition
1 Packaging bag
4 Wing part
5 Seal part
5C Control seal part
6 Point seal part
7 Cut (Steam easy permeable means)
8 Notch (Steam easy permeable means)

PREFERRED EMBODIMENTS OF THE INVENTION

This invention will be hereafter disclosed in detail based on preferred embodiments.

The retort packaging bag for microwave oven heating according to this invention is a packaging bag which is manufactured by using a complex film at least one side of which comprises a sealant layer, folding the complex film or placing the complex films one upon another so as to encounter the sealant layers to each other, sealing the peripheral of the overlapped complex films by a main seal part so as to form a sealed bag, and forming in the bag a region which is isolated from a space for storing contents by a steam port seal part, wherein the steam port seal part is formed consecutively from the main seal part or is formed as a part independent of the main seal part, and wherein the steam port seal part surrounds an steam easy permeable means.

With respect to the complex film, as far as it has a sealant layer at least at one side thereof, any layer constitutions, and any materials for the respective layers may be adaptable. For instance, it may consist of two layers, i.e., a sealant layer and a substrate layer (outermost layer), or it may consists of three or more layers, wherein certain inter layer(s) having various function(s) is arranged between the substrate layer and the sealant layer.

As the resin which constitutes the sealant layer 13, what is used in general as a package material for food which is subjected to heating or heat-cooking with a microwave oven can be used. For example, a low density polyethylene, an ultra low density polyethylene, a linear low density polyethylene, a medium density polyethylene, a high density polyethylene, a non-oriented polyethylene, an ethylene-vinyl acetate copolymer, an ethylene-acrylic acid copolymer, an ethylene-methacrylic acid copolymer, an ethylene-methyl acrylate copolymer, ethylene-ethyl acrylate copolymer, ethylene-methyl methacrylate copolymer, ionomer or the like may be cited. The sealant layer may be formed by the extrusion laminating of such a resin. Alternatively, the sealant layer may be prepared by making a film from such a resin with T-die method or inflation method in advance, and stacking to a heat-resistant substrate layer the obtained film with using the dry lamination or the extrusion laminating method. The thickness of the sealant layer is not particularly limited to anywhere, however, for instance, it may be in the range of 20-100 μm, preferably, in the range of 40-70 μm. Further, when the packaging bag for microwave oven heating according to the present invention is used for a retort food, it is desirable to have a thermal resistance capable of resisting the retort treatment, in general, a thermal resistance capable of resisting 100° C. or more.

With respect to the substrate layer, it will not be also particularly limited, as far as it may be used in general as a package material for food which is subjected to heating or heat-cooking with a microwave oven. Further, the substrate layer may be a single layer or a multilayer (layered product).

For example, an oriented polyethylene terephthalate film, a silica deposited oriented polyethylene terephthalate film, an alumina deposited oriented polyethylene terephthalate film, an oriented nylon film, a silica deposited oriented nylon film, an alumina deposited oriented nylon film, an oriented polypropylene film, a poly vinyl alcohol coated oriented polypropylene film, a nylon 6/methaxylenediamine nylon 6 coextruded cooriented film, a polypropylene/ethylene-vinyl alcohol copolymer coextruded cooriented film, or the like may be cited. Further, the substrate layer may be a complex film which is prepared by laminating two or more above mentioned films.

Incidentally, when an inorganic oxide vapor deposition film is arranged in the complex film by using above mentioned silica deposited oriented polyethylene terephthalate film, alumina deposited oriented polyethylene terephthalate film, silica deposited oriented nylon film, or alumina deposited oriented nylon film, it is possible to heat the contents with an ample heating effect by using a microwave oven, without suffering with a problem of sparking, in contrast to the case of using a complex film having a metallic layer. Further, it is also possible to give a good gas barrier property.

Further, with respect to the complex film in which the inorganic oxide vapor deposition film is layered on the substrate layer, such as the above mentioned silica deposited oriented polyethylene terephthalate film, alumina deposited oriented polyethylene terephthalate film, silica deposited oriented nylon film, or alumina deposited oriented nylon film, if necessary, it is possible to form a functional layer such as a barrier layer or a primer layer onto the inorganic oxide vapor deposition film by coating or the like. When the complex film has such a gas barrier coating layer in addition to the inorganic oxide vapor deposition film, a more stable gas barrier property can be expected. When the complex film has such a primer layer, the adhesion between the respective layers of the complex film can be enhanced and thus the lamination strength of the complex film can be improved.

Incidentally, when as the substrate layer the complex film having an inorganic oxide vapor deposition film is adopted and it is used in combination with the above mentioned sealant layer to form a further complex film, the inorganic oxide vapor deposition film is faced to the sealant layer, and thus it is arranged interior of the complex film, and not exposed at the surface of the complex film. Similarly, when the above gas barrier layer and the primer layer are provided, these layers are arranged interior of the complex film.

The melting point of the substrate layer may be usually 150° C. or more, and the thickness of the substrate layer may be 10-50 μm, preferably, 10-30 μm, although they are not particularly limited thereto.

Now, an explanation about the inorganic oxide vapor deposition film in the film such as silica deposited oriented polyethylene terephthalate film, alumina deposited oriented polyethylene terephthalate film, silica deposited oriented nylon film, or alumina deposited oriented nylon film, will be described. Such inorganic oxide vapor deposition film can be formed by using a chemical vapor deposition method, or a physical vapor deposition method, or a combination thereof, so as to form a single layer film of the inorganic oxide or a multi layer film or complex film of two or more layers of the inorganic oxide(s).

Further, an explanation about the inorganic oxide vapor deposition film formed by the chemical vapor deposition method will be described. Such inorganic oxide vapor deposition film can be formed by the various chemical vapor deposition methods (CVD method) such as the plasma chemical vapor deposition method, the thermal chemical vapor deposition method, the photo chemical vapor deposition method, etc.

Concretely, an vapor deposition film of an inorganic oxide such as silicon oxide, etc., can be formed on one surface of the substrate film by using as a raw material a monomer gas for vapor deposition such as an organic silicon compound, as a carrier gas an inherent gas such as argon gas, helium gas, etc, and as an oxygen feeding gas an oxygen gas, and utilizing a low temperature plasma generation apparatus in accordance with the low temperature plasma chemical vapor deposition method.

As the low temperature plasma generation apparatus, for instance, various apparatuses for generating high-frequency plasma, pulse wave plasma, micro wave plasma, or the like, may be adaptable. Among them, the high-frequency plasma generation apparatus is particularly preferable, for the purpose of generating high active and stable plasma.

As mentioned above, the vapor deposition film of inorganic oxide may be a single layer of a vapor deposition film, or a multilayer of two or more films. Further, as the raw material, a material or a combination of two or more materials may be used, and a vapor deposition film of a mixture of different types of materials can be also formed.

Incidentally, since the formation of vapor deposition film of an inorganic oxide such as silicon oxide in the plasma chemical vapor deposition method is performed by oxidizing the plasma state raw material gas by the oxygen gas on the substrate film and thus forming a thin film of inorganic oxide such as $SiO_x$, the obtained vapor deposition film of an inorganic oxide such as silicon oxide becomes a dense, gapless, and flexible continuous layer. Therefore, as compared with a vapor deposition film of an inorganic oxide such as silicon oxide obtained by the conventional vacuum deposition method, the barrier property of the obtained vapor deposition film of an inorganic oxide such as silicon oxide obtained by the chemical vapor deposition method is extremely high, and thus an adequate barrier property can be attained even with a thin thickness.

Further, since the surface of the substrate film can be purified by $SiO_x$ plasma, and polar groups and free radicals can be created on the surface of the substrate film, the adhesion between the formed vapor deposition film of an inorganic oxide such as silicon oxide and the substrate film can be improved.

As the degree of vacuum at the forming of a continuous film of inorganic oxide such as silicon oxide in the plasma chemical vapor deposition method, it is preferable to adjust to about $1 \times 10^{-1}$-about $1 \times 10^{-4}$ Torr, more desirably, about $1 \times 10^{-1}$-about $1 \times 10^{-2}$ Torr. Since this degree is low as compared with the degree of vacuum at the forming of a vapor deposition film of inorganic oxide such as silicon oxide in the conventional vacuum deposition method, i.e., about $1 \times 10^{-4}$-about $1 \times 10^{-5}$ Torr, it is possible to shorten the vacuum condition setting time for replacing the substrate film, and to make the vacuum condition stable, and also to make the film manufacturing process stable.

Since the vapor deposition film of silicon oxide which is formed by using the monomer gas for vapor deposition such as an organic silicon compound is obtained by causing a chemical reaction of the monomer gas for vapor deposition such as an organic silicon compound with the oxide gas, and contacting the reactant closely to a surface of the substrate film, the vapor deposition film is formed as a dense, flexible thin film, and it is generally composed of silicon oxide represented by the general formula: $SiO_x$ (wherein x is a number of 0-2.) as a main ingredient, and it is a continuous thin film.

Furthermore, as the above vapor deposition film of silicon oxide, it is preferable that it is composed of silicon oxide represented by the general formula: $SiO_x$ (wherein x is a number of 1.3-1.9.) as a main ingredient, from the view points of its transparency, barrier property, etc.

Although the value of X may be varied depending on the molar ratio of the monomer gas for vapor deposition and the oxygen gas, the energy of the plasma, etc., in general, when X becomes small, the gas permeability will become small while the transparency of the film becomes degraded and yellowish.

In a preferable embodiment, the vapor deposition film of silicon oxide may be composed of silicon oxide as a main ingredient, and further include one of carbon, hydrogen and oxygen, or a compound including two or more of such atoms, by dint of chemical bonds, etc.

For instance, compounds having C—H bond(s), compound having Si—H bond(s), or the case that carbon unit forms graphite-, diamond-, or fullerene-like structure, and the case that the organic silicon compound as the raw material or derivatives therefrom is included by the chemical bonds, etc., may be enumerated.

As concrete examples, hydrocarbons having $CH_3$ site(s), hydro silica such as $SiH_3$ silyl, $SiH_2$ silylene, and hydroxide group derivatives such as $SiH_2OH$ silanol, can be mentioned.

With respect to compound other than the above mentioned compound, by varying the condition of the vapor deposition process, etc., it is possible to change the kind and amount of compound included in the vapor deposition film of silicon oxide.

As the content of such compound included in the vapor deposition film of silicon oxide, about 0.1-50%, more desirably, about 5-20%, is preferable.

When the content is less than 0.1%, the impact resistance, spreading property and flexibility of the vapor deposition film of silicon oxide may become insufficient. Thus, when bending, the vapor deposition film is easy to have scratch, crack, etc., and is hardly possible to maintain a high barrier property stably. When the content exceeds to 50%, the barrier property may become degraded, and thus it is not preferable.

Further, in the vapor deposition film of silicon oxide, it is preferable that the compound content decreases with increasing the depth from the surface of the vapor deposition film of silicon oxide. Thereby, at the surface of the vapor deposition film of silicon oxide, the impact resistance can be enhanced by the compound, while at the interface with the substrate film the adhesion between the substrate film and the vapor deposition film can be heighten, since the compound content is low.

With respect to the vapor deposition film of silicon oxide, such characteristic as mentioned above may be confirmed by, for instance, using a surface analytical instrument such as X-ray photoelectron spectroscopy (XPS), secondary ion mass spectroscopy (SIMS), etc., while applying ion etching in the depth direction, so as to practice the elemental analysis of the vapor deposition film of silicon oxide.

As the film thickness of the CVD film of the inorganic oxide such as silicon oxide, it is preferable to be in the range of about 50Å-about 4000Å, more desirably, in the range of about 100Å-about 1000Å. When the thickness is more than 4000Å, it is not preferable because the film may be cracked easily. When the thickness is less than 50Å, it is not preferable because the film may hardly attain the barrier property.

The thickness can be determined by, for instance, using a fluorescent X-ray analyzer (product code: RIX2000) manufactured by Rigaku Corporation, and in accordance with the fundamental parameter method. As means for varying the thickness of the vapor deposition film of silicon oxide, for example, to enhance the depositing rate of the vapor deposition film, namely, to increase the respective amounts of the monomer gas and the oxygen gas, or to delay the vaporizing speed, may be enumerated.

As the monomer gas for vapor deposition to form the vapor deposition film of inorganic oxide such as silicon oxide, for instance, 1,1,3,3-tetramethyl disiloxane, hexamethyl disiloxane, vinyl trimethyl silane, methyl trimethyl silane, hexamethyl disilane, methyl silane, dimethyl silane, trimethyl silane, diethyl silane, propyl silane, phenyl silane, vinyl triethoxy silane, vinyl trimethoxy silane, tetramethoxy silane, tetraethoxy silane, phenyl trimethoxy silane, methyl triethoxy silane, octamethyl cyclotetra siloxane, etc., are usable.

Among the above organic silicon compound, it is particularly preferable to use 1,1,3,3-tetramethyl disiloxane, or hexamethyl disiloxane as the raw material, from the view point of the handling of the compound, and properties of the obtained continuous film.

As the inherent gas, for instance, argon gas, helium gas, etc., are usable.

Then, an explanation about the inorganic oxide vapor deposition film formed by the physical vapor deposition method will be described. Such inorganic oxide vapor deposition film can be formed by the various physical vapor deposition methods (PVD method) such as the vacuum deposition method, the sputtering method, the ion plating method, ion cluster beam method, etc.

Concretely, an vapor deposition film can be formed by using as a raw material metal or metal oxide, vaporizing the raw material with heating, and depositing the vapor on one surface of the substrate film, according to the vacuum deposition method. Alternatively, it can be formed by using as a raw material metal or metal oxide, introducing oxygen in order to oxidize, and depositing the oxidized compound on one surface of the substrate film, according to the oxidation reaction vacuum deposition method. In addition, it can be formed according to the plasma assisted oxidation reaction vacuum deposition method wherein the oxidation is accelerated by the plasma. As the heating method for material of the vapor deposition, for instance, ohmic-resistance heating method, high frequency induction heating method, electron beam heating method (EB), etc., may be usable.

As the vapor deposition film of metallic oxide or inorganic oxide, as far as it is a thin film formed by vapor deposition of a certain metallic oxide, it can be used basically. For example, vapor deposition films of oxides of metals such as silicon (Si), aluminum (Al), magnesium (Mg), calcium (Ca), potassium (K), tin (Sn), sodium (Na), boron (B), titanium (Ti), lead (Pb), zirconium (Zr), yttrium (Y), etc., may be usable. Among them, vapor deposition film of oxide of metal such as silicon (Si), or aluminum (Al) are preferable.

Incidentally, the vapor deposition film of oxides of above mentioned metals can be called metal oxides such as silicon oxide, aluminum oxide, magnesium oxide, etc., and they may be represented by MOx (wherein M is a metallic element, and the range of x is varied depending on the kind of metallic element), for example, $SiO_x$, $AlO_x$, $MgO_x$, etc.

With respect to the range of X, for example, it can take, 0-2 for silicon (Si), 0-1.5 for aluminum (Al), 0-1 for magnesium (Mg), 0-1 for calcium (Ca), 0-0.5 for potassium (K), 0-2 for tin (Sn), 0-0.5 for sodium (Na), 0-1.5 for boron (B), 0-2 for titanium (Ti), 0-1 for lead (Pb), 0-2 for zirconium (Zr), and 0-1.5 for yttrium (Y), individually.

When X=0, it become a complete metal, and it is not transparent, therefore, it can not be used at all. On the other hand, the upper limit of the range of X means the completely oxidized value.

In the cases of silicon (Si) and aluminum (Al), the range of 1.0-2.0 and the range of 0.5-1.5 are more preferable, respectively.

As the film thickness of the PVD film of the inorganic oxide, for example it is preferable to be in the range of about 50Å-about 2000Å, more desirably, in the range of about 100Å-about 1000Å, although it may be varied depending on the kind of the metal, or the kind of the oxide of metal. And, the thickness can beset freely within the above mentioned range.

As the vapor deposition film of the inorganic compound, it is possible to form the film of a mixture of different types of materials by using as the metal or metal oxide mixtures of two or more kinds of material.

Further, as the vapor deposition film of the inorganic compound, it is also possible to make it as a complex film comprising two or more layers of different types of inorganic oxides by using both the chemical vapor deposition method and the physical vapor deposition method.

As the complex film comprising two or more layers of different types of inorganic oxides, the one in which the inorganic oxide vapor deposition film of being dense, flexible, and capable of preventing the cracking relatively is firstly formed on the surface of the substrate film by the chemical vapor deposition method, and then the inorganic oxide vapor deposition film by the physical vapor deposition method is formed so as to construct the complex film having two or more layers is preferable.

Of course, in the present invention, another one in which the inorganic oxide vapor deposition film is firstly formed on the surface of the substrate film by the physical vapor deposition method, and then the inorganic oxide vapor deposition film of being dense, flexible, and capable of preventing the cracking relatively is formed by the chemical vapor deposition method so as to construct the complex film having two or more layers, in reverse order to that of above mentioned case, may be also usable.

Next, an explanation about the barrier layer which may be formed on the surface of the substrate layer, particularly, on a vapor deposition film when the substrate layer is a film having the vapor deposition film will be described. As the coated film having a gas barrier property which composes the barrier layer, for example, the one which is formed by a process including steps of preparing a gas barrier composition which comprises at least one alkoxide represented by the following general formula:

$$R^1{}_nM(OR^2)_m$$

(wherein R1 and R2 are mutually independently an organic group having 1-8 carbon atoms, M is a metallic atom, n is an integer of not less than zero, m is an integer of not less than one, and m+n represent the valence of the M.);
and a polyvinyl alcohol type resin and/or an ethylene-vinyl alcohol copolymer, and which can polycondense according to the sol-gel method under the presence of a catalyst for the sol-gel method, an acid, water, and an organic solvent; coating the gas barrier composition capable of polycondensing according to the sol-gel method onto an inorganic oxide vapor deposition film formed on one surface of the substrate film so as to form a coated layer of the gas barrier composition; and heating the substrate film having the thus formed coated layer at a temperature in the range of 20° C.-150° C. and not more than the melting point of the substrate film used for a time period of 30 seconds-10 minutes, so as to form the coated film having a gas barrier property of the above mentioned gas barrier composition on the inorganic oxide vapor deposition film formed on one surface of the substrate film, may be enumerated, although the coated film having gas barrier property is not particularly limited thereto.

Alternatively, the coated film having a gas barrier property may be formed by a process including steps of preparing a gas barrier composition which comprises at least one alkoxide represented by the following general formula:

$$R^1{}_nM(OR^2)_m$$

(wherein R1 and R2 are mutually independently an organic group having 1-8 carbon atoms, M is a metallic atom, n is an integer of not less than zero, m is an integer of not less than one, and m+n represent the valence of the M.);
and a polyvinyl alcohol type resin and/or an ethylene-vinyl alcohol copolymer, and which can polycondense according to the sol-gel method under the presence of a catalyst for the sol-gel method, an acid, water, and an organic solvent; coating repeatedly the gas barrier composition capable of polycondensing according to the sol-gel method onto an inorganic oxide vapor deposition film formed on one surface of the substrate film so as to form two or more coated layers of the gas barrier composition; and heating the substrate film having the thus formed two or more coated layers at a temperature in the range of 20° C.-150° C. and not more than the melting point of the substrate film used for a time period of 30 seconds-10 minutes, so as to form a complex polymer layer consisting of the two or more coated films having a gas barrier property of the above mentioned gas barrier composition on the inorganic oxide vapor deposition film formed on one surface of the substrate film.

As the alkoxide represented by the general formula: $R^1{}_nM(OR^2)_m$ which composes the coated film having a gas barrier property as the gas barrier layer according to the present invention, it is possible to use at least one member selected from the group consisting of partial hydrolysates of alkoxide and hydrolyzed condensates of alkoxide. Further, as the partial hydrolysate of alkoxide, it is not limited to the one in which the whole alkoxy groups are hydrolyzed, but those which at least one alkoxy group is hydrolyzed, and mixtures thereof are also included. As the hydrolyzed condensates of alkoxide, dimer or more multimer of partial hydrolysates of alkoxide, more concretely, the dimer to the hexamer may be used.

As the metal atom represented by M of the above general formula: $R^1{}_nM(OR^2)_m$ silicon, zirconium, titanium, aluminum, etc., may be adaptable. As the preferable metal, for example, silicon can be mentioned.

As the usage of the alkoxide, it is possible to use one alkoxide singly, or use a combination of two or more different metals of alkoxides by mixing them in a same solution.

As concrete examples of the organic group represented by $R^1$ in the alkoxide represented by the above general formula: $R^1{}_nM(OR^2)_m$, for instance, an alkyl group such as methyl group, ethyl group, n-propyl group, i-propyl group, n-butyl group, i-butyl group, sec-butyl group, t-butyl group, n-hexyl group, n-octyl group, etc., may be enumerated.

As concrete examples of the organic group represented by $R^2$ in the alkoxide represented by the above general formula: $R^1{}_nM(OR^2)_m$, for instance, methyl group, ethyl group, n-propyl group, i-propyl group, n-butyl group, sec-butyl group, etc., may be enumerated.

Incidentally, in a molecule, such alkyl groups may be same with or different form each other.

As the alkoxide represented by the above general formula: $R^1{}_nM(OR^2)_m$, for example, the one in which M is Si is preferable.

As the above mentioned alkoxy silane, one represented by the general formula: $Si(ORa)_4$ (wherein Ra is a lower alkyl group.) can be enumerated.

As Ra in the above formula, for instance, methyl group, ethyl group, n-propyl group, n-butyl group, etc., may be used.

As concrete examples of the above mentioned alkoxy silane, for instance, tetramethoxy silane $Si(OCH_3)_4$, tetraethoxy silane $Si(OC_2H_5)_4$, tetrapropoxysilane $Si(OC_3H_7)_4$, tetrabutoxy silane $Si(OC_4H_9)_4$, etc., may be enumerated.

As the alkoxide represented by the above general formula: $R^1{}_nM(OR^2)_m$, for example, an alkyl alkoxy silane represented by the general formula: $Rb_nSi(ORc)_{4-m}$, (wherein n is an integer of not less than zero, m is an integer of 1, 2 and 3, Rb and Rc are mutually independently one of methyl group, ethyl group, n-propyl group, n-butyl group, etc.) may be usable.

As concrete examples of the abovementioned alkyl alkoxy silane, for instance, methyl trimethoxy silane $CH_3Si(OCH_3)_3$, methyl triethoxy silane $CH_3Si(OC_2H_5)_3$, dimethyl dimethoxy silane $(CH_3)_2Si(OCH_3)_2$, dimethyl diethoxy silane $(CH_3)_2Si(OC_2H_5)_2$, etc., may be enumerated.

The above mentioned alkoxy silane may be used singly or a combination of two or more kinds, ditto for the above mentioned alkyl alkoxy silane.

Polycondensates of the above mentioned alkoxy silanes are also usable, concretely, for example, polytetramethoxy silane, polytetraethoxy silane, etc., can be used.

Further, as the alkoxide represented by the above general formula: $R^1{}_nM(OR^2)_m$, the ones in which M is Zr, i.e., zirconium alkoxides may be also usable.

As concrete examples of the zirconium alkoxide, for example, tetramethoxy zirconium $Zr(OCH_3)_4$, tetraethoxy zirconium $Zr(OC_2H_5)_4$, tetra-i-propoxy zirconium $Zr(iso-OC_3H_7)_4$, tetra-n-butoxy zirconium $Zr(OC_4H_9)_4$, etc., may be enumerated.

As the alkoxide represented by the above general formula; $R^1{}_nM(OR^2)_m$, the ones in which m is Ti, i.e., titanium alkoxides may be also usable.

As concrete examples of the titanium alkoxide, for example, tetramethoxy titanium $Ti(OCH_3)_4$ tetraethoxy titanium $Ti(OC_2H_5)_4$, tetra-i-propoxy titanium $Ti(iso-OC_3H_7)_4$, tetra-n-butoxy titanium $Ti(OC_4H_9)_4$, etc., may be enumerated.

As the alkoxide represented by the above general formula: $R^1{}_nM(OR^2)_m$, the ones in which M is Al, i.e., aluminum alkoxides may be also usable.

As concrete examples of the aluminum alkoxide, for example, tetramethoxy aluminum $Al(OCH_3)_4$, tetraethoxy aluminum $Al(OC_2H_5)_4$, tetra-i-propoxy aluminum $Al(iso-OC_3H_7)_4$, tetra-n-butoxy aluminum $Al(OC_4H_9)_4$, etc., may be enumerated.

As alkoxides as mentioned above, it is possible to use two or more kinds of compounds in combination. Particularly, when using an alkoxy silane and a zirconium alkoxide in combination, it would be expected to improve the toughness, thermal resistance, etc., of the obtained barrier layer, and to avoid causing deterioration of the retort resistance of film on the orientation.

As the using amount of the zirconium alkoxide in the above combination, it may be an amount of not more than 10 parts by weight, more preferably, about 5 parts by weight, based on 100 parts by weight of the alkoxy silane. When it exceeds 10 parts by weight, the obtained gas barrier coated film will tend to cause gelation, and the brittleness of the film becomes large, therefore, the gas barrier coated layer will tend to exfoliate from the substrate film with ease when coating on the substrate film, and thus, it is not preferable.

Separately, when using an alkoxy silane and a titanium alkoxide in combination, it would be expected to lower the thermal conductivity of the obtained barrier layer, and thus, to improve extremely the thermal resistance of the gas barrier multilayered film.

As the using amount of the titanium alkoxide in the above combination, it may be an amount of not more than 5 parts by weight, more preferably, about 3 parts by weight, based on 100 parts by weight of the alkoxy silane.

When it exceeds 5 parts by weight, the brittleness of the obtained gas barrier coated film will tend to become large, therefore, the gas barrier coated layer will tend to exfoliate from the substrate film with ease when coating on the substrate film, and thus, it is not preferable.

As the polyvinyl alcohol type resin and/or the ethylene-vinyl alcohol copolymer which forms the barrier layer in the gas barrier coated film, a polyvinyl alcohol type resin and an ethylene-vinyl alcohol copolymer may be used individually singly, or a polyvinyl alcohol type resin and an ethylene-vinyl alcohol copolymer may be used in combination. When using the polyvinyl alcohol type resin and/or the ethylene-vinyl alcohol copolymer, the gas barrier property, waterproof, and weather resistance, etc., of the gas barrier coated film can be improved significantly.

Particularly, when a polyvinyl alcohol type resin and an ethylene-vinyl alcohol copolymer are used in combination, it is possible to provide a gas barrier coated film which is excellent in the hot-water resistance and the gas barrier property after hot-water treatment as well as the above mentioned gas barrier property, waterproof, and weather resistance.

In the case that the polyvinyl alcohol type resin and the ethylene-vinyl alcohol copolymer are used in combination, it is preferable that the mixing ratio thereof (polyvinyl alcohol type resin:ethylene-vinyl alcohol copolymer) is about 10:0.05-about 10:6, more desirably, about 10:1.

Further, it is preferable that the content of the polyvinyl alcohol type resin and/or the ethylene-vinyl alcohol copolymer is in the range of 5-500 parts by weight, more desirably, about 20-200 parts by weight, based on 100 parts by weight of total amount of the alkoxides, so as to prepare the gas barrier composition.

When the content exceeds 500 parts by weight, the brittleness of the gas barrier coated film may become large, and the waterproof and weather resistance of the gas barrier coated film also tends to deteriorate, thus it is not preferable. On the other hand, when the content is less than 5 parts by weight, the gas barrier property may deteriorate, thus, it is not preferable.

As the polyvinyl alcohol type resin, in general, the one which is obtained by saponifying polyvinyl acetate can be used.

Further, the polyvinyl alcohol type resin is not particularly limited to anyone, and thus, it may be a partially saponified polyvinyl alcohol in which, for instance, several ten percentage of the acetic acid groups are still remained, or the complete saponified polyvinyl alcohol in which no acetic acid group exists, or a modified polyvinyl alcohol type resin in which OH groups are denatured.

As concrete examples of the polyvinyl alcohol type resin, RS-100 (saponification degree=99%, polymerization degree=1,000), a polymer of RS series polymer of KURARAY Co., Ltd., KURARAY POFAL® LM-20SO (saponification degree=40%, polymerization degree=2,000) of the same company as above, and Gohsenol® NM-14 (saponification degree=99%, polymerization degree ~1,400) of Nippon Synthetic chemical Industry Co., Ltd., etc., may be enumerated.

As the ethylene-vinyl alcohol copolymer, it is possible to use a saponified material of ethylene-vinyl alcohol copolymer, i.e., one obtained by saponifying ethylene-vinyl alcohol copolymer.

Concretely, as the saponified material, a partially saponified material in which, for instance, several ten percentages of the acetic acid groups are still remained, and the one in which only a few percentage of the acetic acid groups is remained, as well as the complete saponified polyvinyl alcohol in which no acetic acid group exists, are included. Particularly, it is preferable to use the one of which saponification degree is not less than 80%, desirably, not less than 90%, and more desirably, not less than 95%, from the view point of the gas barrier property, although it is not limited thereto.

Further, it is preferable to use an ethylene-vinyl alcohol copolymer in which the content of the repetition unit derived from ethylene in the ethylene-vinyl alcohol copolymer (herein after, it is also referred as "ethylene content".) is normally in the range of 0-50 mol %, and desirably, in the range of 20-45 mol %.

As concrete examples of the ethylene-vinyl alcohol copolymer, EVAL® EP-F101 (ethylene content: 32 mol %) of KURARAY Co., Ltd., and SOARNOL® D2908 (ethylene content: 29 mol %) of Nippon Synthetic chemical Industry Co., Ltd., etc., may be enumerated.

Next, the gas barrier composition which forms a gas barrier coated film as the barrier layer will be described. As such a gas barrier composition, a gas barrier composition which comprises at least one alkoxide represented by the following general formula: $R^1{}_nM(OR^2)_m$ (wherein $R^1$ and $R^2$ are mutually independently an organic group having 1-8 carbon atoms, M is a metallic atom, n is an integer of not less than zero, m is an integer of not less than one, and m+n represent the valence of the M.) as mentioned above; and the polyvinyl alcohol type resin and/or the ethylene-vinyl alcohol copolymer as mentioned above, and which can polycondense according to the sol-gel method under the presence of a catalyst for the sol-gel method, an acid, water, and an organic solvent is prepared.

On the preparation of the above mentioned gas barrier composition, for example, any additive such as a silane coupling agent may be added thereto.

As such silane coupling agent, any known organoalkoxy silanes having organic reactive functional group(s) may be used.

Particularly, organoalkoxy silanes having epoxy functional group(s) are preferable, and which includes, for instance, γ-glycidoxy propyl trimethoxy silane, γ-glycidoxy propyl methyl diethoxy silane, and β-(3,4-epoxy cyclohexyl)ethyl trimethoxy silane, etc.

Such silane coupling agents are used singly or two or more of them in combination. The usage amount of the silane coupling agent may be in the range of about 1-20 parts by weight based on 100 parts by weight of the above alkoxy silane.

When the silane coupling agent is used at an amount of more than 20 parts by weight, the rigidity and the brittleness of the obtained gas barrier coated film may become large, and also the insulation and the workability of the obtained gas barrier coated film also tend to deteriorate, and thus such condition is not preferable.

Next, as the catalyst for the sol-gel method, to be used for the above gas barrier composition, mainly as the polycondensation catalyst, a tertiary amine which is substantially insoluble to water and soluble to an organic solvent can be used.

Concretely, for instance, N,N-dimethyl benzyl amine, tripropyl amine, tributyl amine, tripentyl amine, etc, may be used. Particularly, N,N-dimethyl benzyl amine is preferable.

The usage amount thereof is preferable to be in the range of 0.01-1.0 part by weight, desirably, about 0.03 part by weight, based on 100 parts of the total amount of above alkoxides and silane coupling agent.

The acid used in the above mentioned gas barrier composition, functions as a catalyst for the sol-gel method, mainly as the catalyst for hydrolysis of the above mentioned alkoxide and silane coupling agent.

As such acid, for example, mineral acids such as sulfuric acid, hydrochloric acid, nitric acid, etc.; and organic acids such as acetic acid, tartaric acid, etc., may be used.

The usage amount of the acid is preferable to be in the range of about 0.001-0.05 mol, desirably, about 0.01 mol, based on the total mol of alkoxide moieties in the alkoxide and silane coupling agent (for example, silicate portion).

Further, in the above mentioned gas barrier composition, water can be added in the range of 0.1-100 mol, desirably, about 0.8-2 mol, based on the total mol of above mentioned alkoxide.

When the water content exceeds 2 mol, the polymer obtained from the above mentioned alkoxy silane and metallic alkoxide may show spherical shapes, and further may become a low density, porous polymer in which the spherical particles are mutually cross linked tree dimensionally. Since such porous polymer can not contribute to the improvement of gas barrier property of the gas barrier laminated film, it is not preferable.

When the water content is less than 0.8 mol, it is also not preferable because the hydrolysis can not proceed adequately.

As the organic solvent used in the above mentioned gas barrier composition, for example, methyl alcohol, ethyl alcohol, n-propyl alcohol, isopropyl alcohol, n-butanol, etc., may be used.

In the above mentioned gas barrier composition, it is preferable that the polyvinyl alcohol type resin and/or the ethylene-vinyl alcohol copolymer is in the state of being solved by a coating solution including above alkoxide and silane coupling agent, and therefore, the kind of organic solvent used would be chosen appropriately.

When using the organic solvent in combination with the polyvinyl alcohol type resin and/or the ethylene-vinyl alcohol copolymer, it is preferable to use n-butanol.

Incidentally, as an ethylene-vinyl alcohol copolymer solved in a solvent, a commercially obtain able product such as SOARNOL can be used.

The usage amount of the organic solvent may be usually in the range of about 30-500 parts by weight based on 100 parts of the total amount of the alkoxide, silane coupling agent, the polyvinyl alcohol type resin and/or the ethylene-vinyl alcohol copolymer, the acid and the catalyst for the sol-gel method.

Concretely, the barrier layer may be manufactured as follows. At first, a gas barrier composition (coating solution) is prepared by blending an alkoxide such as the above mentioned alkoxy silane, a silane coupling agent, a polyvinyl alcohol type resin and/or an ethylene-vinyl alcohol copolymer, a catalyst for the sol-gel method, an acid, water, an organic solvent, and if necessary, a metallic alkoxide, etc.

Then, in the gas barrier composition (coating solution), the polycondensation reaction will be in progress gradually. Next, onto the inorganic oxide vapor deposition film formed on one surface of the substrate film, the gas barrier composition (coating solution) is coated by a normal procedure, and dried.

By the drying, the polycondensation of the above alkoxide such as the above mentioned alkoxy silane, the metallic alkoxide, the silane coupling agent, and the polyvinyl alcohol type resin and/or the ethylene-vinyl alcohol copolymer can further progress so that a coated film is formed.

More preferably, by repeating the above mentioned coating procedure, multiple coated film of two or more layers are formed.

At the end, the substrate film which was coated with the coating solution is subjected to heating treatment at a temperature in the range of about 20° C.-150° C. and not more than the melting point of the substrate film used, more desirably, at a temperature in the range of about 50° C.-120° C., for a time period of 30 seconds-10 minutes, so as to form one or more than two layer of coated film having a gas barrier property of the above mentioned gas barrier composition (coating solution) on the inorganic oxide vapor deposition film formed on one surface of the substrate film, so that the barrier film according to the present invention can be prepared.

The barrier layer thus prepared is excellent in gas barrier property.

As for the barrier films in which is manufactured by the same procedures of coating, drying and heating as above except that an ethylene-vinyl alcohol copolymer, or both a polyvinyl alcohol type resin and an ethylene-vinyl alcohol copolymer are used instead of the polyvinyl alcohol type resin, it will be expected that the gas barrier property after hot-water treatment such as boiling treatment or retort treatment can be further improved.

When the barrier layer is formed without using the ethylene-vinyl alcohol copolymer, or without using both a polyvinyl alcohol type resin and an ethylene-vinyl alcohol copolymer in combination, namely formed only by using a polyvinyl alcohol type resin, it is possible to form a complex layer by preparing a first coated layer of a gas barrier composition having a polyvinyl alcohol type resin in advance, and then preparing a second coated layer of another gas barrier composition having an ethylene-vinyl alcohol copolymer on the first coated layer in order to improve the gas barrier property of the barrier layer.

Further, the improvement of the gas barrier property of the barrier layer can be also attained effectively by layering multiple coated layers of gas barrier composition having an ethylene-vinyl alcohol copolymer, or having both a polyvinyl alcohol type resin and an ethylene-vinyl alcohol copolymer in combination.

Next, the method for manufacturing the barrier layer according to the present invention will be explained with an embodiment in which an alkoxy silane is used as alkoxide. At first, the alkoxy silane and a metallic alkoxide are hydrolyzed by water added. On the hydrolysis, the acid functions as a catalyst for the hydrolysis. Next, by the act of the catalyst for the sol-gel method, protons are removed form the created hydroxide groups, and the hydrolysis products are mutually dehydro-polycondensated. Simultaneously, the silane coupling agent is also hydrolyzed by the acid catalyst so that the alkoxy groups are converted to hydroxide groups. Further, by the aid of a basic catalyst, ring openings of epoxy groups are also induced so as to provide hydroxide groups. The polycondensation of the hydrolyzed silane coupling agent and the hydrolyzed alkoxide may also progress.

Further, in the reaction system, since the polyvinyl alcohol type resin, or the ethylene-vinyl alcohol copolymer, or the polyvinyl alcohol type resin and the ethylene-vinyl alcohol copolymer are present, the reaction with the hydroxide groups owned by the polyvinyl alcohol type resin and the ethylene-vinyl alcohol copolymer is also induced.

The thus produced polycondensed material becomes a complex polymer which contains inorganic portions which comprises linkages such as Si—O—Si, Si—O—Zr, Si—O—Ti, etc., and organic portions derived from the silane coupling agent.

On the above reaction, for instance, a liner polymer which has a partial structural formula of the following formula (III) and also has portions derived from the silane coupling agent is produced at first.

This polymer has OR groups (alkoxy groups such as ethoxy groups) as the form of being branched from the liner polymer.

The OR groups are hydrolyzed by the aid of the presenting acid as the catalyst so as to be converted to OH groups, and the OH groups thus created are deprotonated firstly by the aid of the catalyst for the sol-gel method (basic catalyst), and then polycondensed.

Namely, it will be considered that these OH groups cause the polycondensation reaction with the polyvinyl alcohol type resin as shown in the following formula (I), or the ethylene-vinyl alcohol copolymer as shown in the following formula (II), so that the complex polymer having Si—O—Si linkages as shown in the following formula (IV), or the copolymerized complex polymers as shown in the following formulae (V) and (VI).

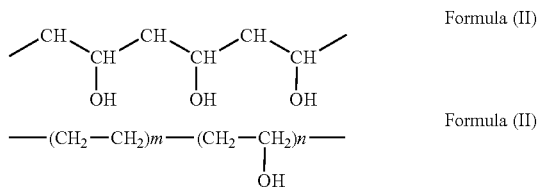

Formula (II)

Formula (II)

wherein m, n are mutually independently an integer of not less than one.

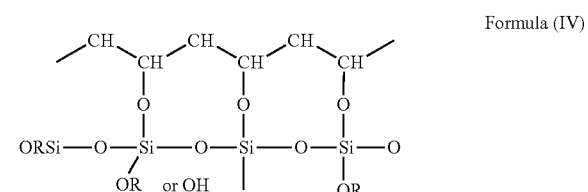

Formula (III)

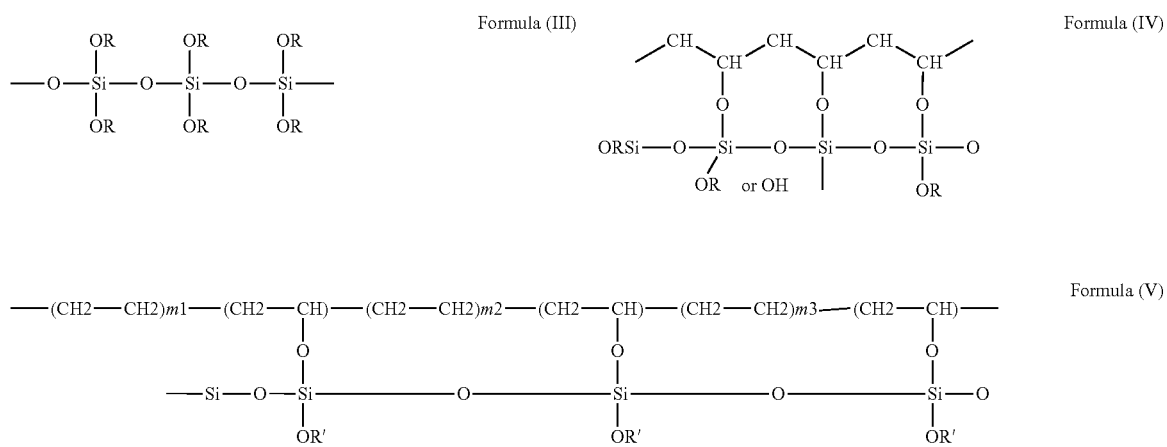

Formula (IV)

Formula (V)

wherein the R' is H or an alkyl group, and m1, m2, and m3 are mutually independently an integer of not less than one.

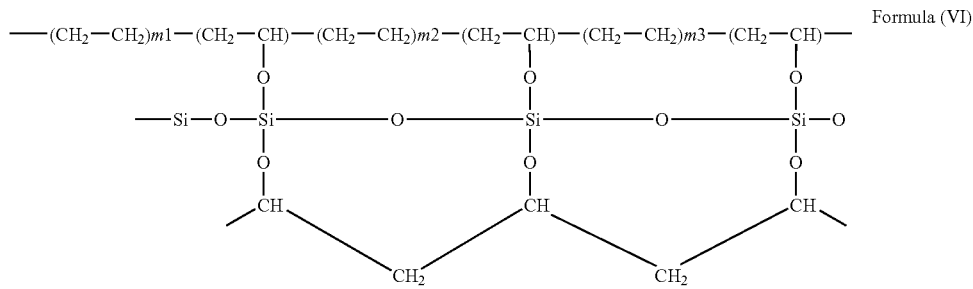

wherein m1, m2, and m3 are mutually independently an integer of not less than one.

The above mentioned reaction can proceed at a normal temperature, and the viscosity of the gas barrier composition (coating solution) increases during its preparation.

When this gas barrier composition (coating solution) is developed onto an inorganic oxide vapor deposition film formed on one surface of the substrate film, and then subjected to heating in order to remove the solvent and alcohol produced by the polycondensation reaction, the polycondensation reaction is completed, and a transparent coated film is formed on the inorganic oxide vapor deposition film formed on one surface of the substrate film.

When the coated films are repeatedly formed as a layered product, the complex polymers in the respective coated layer are also condensed mutually, and the rigid adhesion between the layers can be attained.

Further, because the organic reactive functional groups of the silane coupling group, and the hydroxide groups produced by the hydrolysis can bond to the functional groups such as hydroxide groups, etc., on the surface of the inorganic oxide vapor deposition film formed on one surface of the substrate film, the good adhesion between the surface of the inorganic oxide vapor deposition film and the coated layer can be attained.

In the method mentioned above, since the water content added is regulated to 0.8-2 mol, desirably 1.5 mol based on 1 mol of the alkoxides, the liner polymer as above mentioned can be produced.

Such liner polymer has crystallinity, and takes a structure wherein many minute crystals are embedded in an amorphous portion.

Since such crystalline structure is similar with those of the crystalline organic polymers (for instance, polyvinylidene chloride and polyvinyl alcohol), and the polar groups (OH groups) are partially existing in the molecule, the cohesive energy of the molecule is high and the rigidity of the molecular chains is also high, and thus it can show a good barrier property.

Since the barrier layer thus formed possesses the excellent properties as mentioned above, it is useful for the packaging material. Particularly, since it is excellent in the gas barrier property (which can block out or inhibit the permeations of $O_2$, $N_2$, $H_2O$, $CO_2$, etc.), it can be used preferably as a barrier substrate material which constitutes a food packaging film.

Especially, when using for a so-called gas filled packaging wherein a gas such as $N_2$ or $CO_2$ is filled in the packaging, the excellent gas barrier property is quite useful for sustaining the filler gas.

Furthermore, the barrier layer is superior to the resistance to hot-water treatment, particularly to high pressure hot-water treatment (retort treatment), and thus can show a quite excellent gas barrier property even under such treatment.

When the barrier layer is formed on the inorganic oxide vapor deposition film, since the vapor deposition film and the barrier layer can create chemical bonds, hydrogen bonds, and coordinate bonds, etc., there between, owing to the hydrolysis and cocondensation reactions, the adhesion between the vapor deposition film and the barrier layer can be enhanced, and thus they can perform a more excellent gas barrier property by virtue of the synergistic effect of the two layers.

As the method for coating the gas barrier composition as mentioned above, for instance, coating means such as roll coating such as gravure roll coating, spray coating, spin coating, dipping, brush coating, bar coating, applicator coating, may be used, and with a single coating or multiple coating, a coated layer having a dried thickness of about 0.01-30 μm, desirably, about 0.1-10 μm can be given. Further, by heating and drying under the normal atmosphere, at 50-300° C., desirably, at 70-200° C., for 0.005-60 minutes, desirably, for 0.01-10 minutes, the condensation can be progressed so as to give a gas barrier coated film.

If necessary, it is possible to apply a primer onto the inorganic oxide vapor deposition film in advance of coating the gas barrier composition. The other preliminary treatments such as corona discharge treatment, plasma treatment, etc., may also be applicable.

Next, the primer layer formed on the substrate layer will be described. Such primer layer will be provided in order to improve the adhesion and layered strength between the inorganic oxide vapor deposition layer and the sealant layer mentioned above when the primer layer is applied onto the vapor deposition layer formed on the surface of the substrate layer and then the sealant layer is applied on the primer layer, or between the inorganic oxide vapor deposition layer and a certain layer such as a printed design layer, an adhesive agent layer for lamination, anchor coating agent layer, melted extruded resin layer, etc., which may be optionally arranged in the vapor deposition layer and the sealant layer. Incidentally, when the barrier layer as mentioned above is provided on the inorganic oxide vapor deposition layer, the primer layer may be formed on the barrier layer.

Such primer layer, for instance, can be formed by using a polyurethane or polyester type resin composition which includes polyurethane or polyester type resin as a main vehicle ingredient, a silane coupling agent at an amount of 0.05-10% by weight, desirably, at an amount of about 0.1-5% by weight, and a filling agent at an amount of about 0.1-20% by weight, desirably, at an amount of about 1-10% by weight, individually based on an amount of 1-30% by weight of the polyurethane or polyester type resin, if necessary, which may further include a stabilizing agent, a hardening agent, a crosslinking agent, a lubricant, UV absorbing agent, and other additives, and which is prepared by adding a solvent and/or a diluent and mixing them adequately; coating the composition onto a face to be coated, for example, onto the inorganic oxide vapor deposition film with using a coating method such as roll coating, gravure coatings knife coating, dipping, spray coating; and then drying up the coated film in order to remove the solvent, the diluent, etc.; and optionally applying an aging treatment. However, it is not particularly limited thereto.

As the film thickness of the primer layer, for example, it is preferable to be in the range of about 0.1-1.0 g/m$^2$ (in dried condition).

By such primer layer, it is possible to improve the adhesion between the above mentioned inorganic oxide vapor deposition layer and the layer such as the sealant layer. Further, by enhancing stretching ability of the primer layer, it is also possible to improve the workability of the film in the laminate process or after the bag forming process, and to prevent the cracking in the inorganic oxide vapor deposition film in the post-treatment.

As the polyurethane type resin which may compose the polyurethane type resin composition, for example, the one which is obtained by the reaction of a polyfunctional isocyanate with a hydroxyl group containing compound can be used.

Concretely, for instance, it is possible to use a one liquid curing type or two liquids curing type polyurethane type resin which is obtained by the reaction of a polyfunctional isocyanate, such as an aromatic polyisocyanate involving, for example, tolylene diisocyanate, diphenyl methane diisocyanate, polymethylene polyphenylene polyisocyanate; or an aliphatic isocyanate involving, for example, hexamethylene diisocyanate, xylylene diisocyanate; with a hydroxyl group containing compound such as polyether polyol, polyester polyol, polyacrylate polyol, etc.

As the polyester type resin which may compose the polyester type resin composition, for example, a thermoplastic polyester type resin which is produced by the polycondensation between at least one or more of aromatic saturated dicarboxylic acids which have as basic frame the benzene nucleus such as terephthalic acid, and at least one or more of saturated bivalent alcohols. As the above mentioned aromatic saturated dicarboxylic acids which have as basic frame the benzene nucleus, for example, terephthalic acid, isophthalic acid, phthalic acid, diphenyl ether-4,4-dicarboxylic acid, or the like, may be usable.

As the abovementioned saturated bivalent alcohol, for example, an aliphatic glycol such as ethylene glycol, propylene glycol, trimethylene glycol, tetramethylene glycol, diethylene glycol, polyethylene glycol, polypropylene glycol, polytetramethylene glycol, hexamethylene glycol, dodecamethylene glycol, neopentyl glycol, etc.; a cycloaliphatic glycol such as cyclohexane dimethanol, etc.; or an aromatic diol such as 2,2-bis(4'-β-hydroxy ethoxy phenyl) propane, naphthalene diol, etc.; may be usable.

As the above mentioned polyester type resin, concretely, for instance, thermoplastic polyethylene terephthalate resin produced by the polycondensation of terephthalic acid and ethylene glycol; polybutylene terephthalate resin produced by the polycondensation of terephthalic acid and tetramethylene glycol; polycyclohexane dimethylene terephthalate resin produced by the polycondensation of terephthalic acid and 1,4-cyclohexane dimethanol; polyethylene terephthalate resin produced by the copolycondensation of terephthalic acid, isophthalic acid and ethylene glycol; polyethylene terephthalate resin produced by the copolycondensation of terephthalic acid, ethylene glycol, and 1,4-cyclohexane dimethanol; polyethylene terephthalate resin produced by the copolycondensation of terephthalic acid, isophthalic acid, ethylene glycol and propylene glycol; polyester polyol resin, or the like may be enumerated.

It is also possible to perform the copolycondensation with further addition of one or more of aliphatic saturated dicarboxylic acids such as malonic acid, succinic acid, glutaric acid, adipic acid, pimelic acid, suberic acid, azelaic acid, sebacic acid, dodecanoic acid in addition to the above mentioned aromatic saturated dicarboxylic acid which has as basic frame the benzene nucleus, and the usage amount thereof is preferable to be in the range of about 1-10% by weight based on the amount of the aromatic saturated dicarboxylic acid which has as basic frame the benzene nucleus.

Next, as the silane coupling agent which may compose the polyurethane type or polyester type resin composition, it is possible to use one or more of organic functional silane monomers having a binary reactivity, such as γ-chloropropyl trimethoxy silane, vinyl trichloro silane, vinyl triethoxy silane, vinyl-tris (β-methoxy ethoxy) silane, γ-methacryloxy propyl trimethoxy silane, β-(3,4-epoxy cyclohexyl)ethyl trimethoxy silane, γ-glycidoxy propyl trimethoxy silane, vinyl triacetoxy silane, γ-mercaptopropyl trimethoxy silane, N-β (amino ethyl)-γ-aminopropyl methyl dimethoxy silane, γ-ureido propyl triethoxy silane, bis(β-hydroxy ethyl)-γ-aminopropyl triethoxy silane, γ-amino propyl silicone aqueous solution, etc.

The above mentioned silane coupling agent can create silanol group (SiOH) by hydrolysis of the functional group existing in one end of its molecule, such as chloro, alkoxy, or acetoxy group, and then the silanol group can react with a metal which composes the inorganic oxide vapor deposition layer, or an active functional group such as hydroxyl group on the surface of the inorganic oxide vapor deposition layer by a certain action such as dehydro-condensation reaction, so that the silane coupling agent is modified on the surface of the inorganic oxide vapor deposition layer with a linkage such as covalent linkage. In addition, by virtue of the absorption of the silanol group per se into the surface of the inorganic oxide vapor deposition layer, and hydrogen bond, the silane coupling agent can form strong linkages with the inorganic oxide vapor deposition layer.

On the other hand, the organic functional group existing in another end of silane coupling agent, such as vinyl, methacryloxy, amino, epoxy, mercapto, etc., can react with a material which composes the layer formed on the silane coupling agent thin layer, such as, printed design layer, adhesive agent layer for lamination, anchor coating agent layer, or the like, so as to form a strong linkage. Further, via such a layer as printed design layer, adhesive agent layer for lamination, anchor coating agent layer, or the like, the sealant layer can be tightly adhered so as to enhance the lamination strength. Thus, a tight layered structure showing high lamination strength can be formed.

Further, by utilizing the inorganic property and the organic property which are owned by the silane coupling agent, the tight adhesion of the inorganic oxide vapor deposition layer and the sealant layer via the printed design layer, adhesive agent layer or anchor coating agent layer can be enhanced, and thus the lamination strength can be improved.

As the above mentioned filling agent which may compose the above mentioned polyurethane type or polyether type resin composition, for instance, calcium carbonate, barium sulfate, alumina white, silica, talc, glass frit, resin powder, etc., may be usable.

The above mentioned filling agent is used to regulate the viscosity of the solution of the above mentioned polyurethane type or polyether type resin composition so as to improve the coating capability of the solution, and also to improve the cohesion of the coating film by binding to the polyurethane type or polyether type resin as a binding resin via the silane coupling agent.

Further, as inter layer (s) which may be provided in the complex film according to the present invention for the purpose of giving a barrier property or a mechanical strength such as puncture resistance, any inter layer(s) which have been used in the packing material for foods to be heated or heat-cooked may be used. Concrete examples thereof are similar to those exemplified as the above mentioned substrate layer 11. Further, as the inter layer which is provided between the substrate layer and the sealant layer, such as the printed design layer, adhesive agent layer or anchor coating agent layer, various known ones may be adoptable, without any particular limitation.

As the complex film used in the present invention, concretely, for instance, the one in which as the outermost layer (substrate layer) a polyethylene terephthalate film (PET) or an inorganic oxide deposited PET film in which alumina, silica or the like is deposited on the PET; as the inter layer a nylon film such as biaxially oriented nylon film (ONy) or inorganic oxide deposited ONy film in which alumina, silica or the like is deposited on the ONy; and as the sealant layer which becomes the innermost layer a heat sealable polyolefin film (PO) such as non-oriented polypropylene (CPP), linear low density polyethylene (LLDPE), low density polyethylene (LDPE), high density polyethylene (HDPE); are layered in that order, particularly, a layered structure of PET or inorganic oxide deposited PET*/CPP, or a layered structure of PET or inorganic oxide deposited PET*/ONy/CPP, may be used in general, although the complex film is not particularly limited thereto. Incidentally, the asterisk * marked on the "inorganic oxide deposited PET" denotes the side thereof on which the inorganic oxide vapor deposition layer exists in the layered structure.

When the inorganic oxide deposited PET is used as the substrate layer, it is preferable to use the one in which the above mentioned barrier layer and/or the primer layer are further formed on the inorganic oxide vapor deposition layer.

The stacking of the substrate layer or the inter layer and the sealant layer can be accomplished by any known method such as the coextrusion laminating method, the dry lamination method, as far as the lamination strength in hot condition can lie in the specific range as mentioned later.

Then, in the packaging bag according to the present invention, the lamination strength between the layers of the complex film in hot condition is set to be not less than 1.5 N/15 mm in width, desirably, to be in the range of 2 N/15 mm in width to 5 N/15 mm in width, and more desirably, to be in the range of 3 N/15 mm in width to 5 N/15 mm in width, and the seal strength at least at the steam port seal part in hot condition is set to be not more than 28 N/15 mm in width, desirably, to be in the range of 5 N/15 mm in width to 25 N/15 mm in width, and more desirably, to be in the range of 5 N/15 mm in width to 15 N/15 mm in width.

FIG. 1 is a sectional view for illustrating schematically the constitution around the seal part at a randomly chosen point. As shown in this figure, the seal strength $S_s$ in hot condition denotes the strength obtained when the encountered sealant layers of the complex films are peeled off from each other (between $L_{seal}$ and $L_{seal}$) under the heating condition as above defined, and the lamination strength $S_L$ in hot condition denotes the strength obtained when peeling off between the respective layers which constitutes the complex film per se (for instance, in the embodiment shown in FIG. 1, between $L_{sub}$ and $L_{int}$, and between $L_{int}$ and $L_{seal}$) under the heating condition as above defined.

Namely, in this invention, by taking an appropriate balance of the lamination strength between the layers of the complex film in hot condition and the seal strength at the steam port seal part in hot condition, to open the steam port seal part and to release the steam generated at the microwave oven heating certainly and gently through a communicated steam easy permeable means can be attained without causing any adverse problems such as explosion of the packaging bag and regression in the main seal part. Even when the lamination strength in hot condition satisfies the above defined range, a great fear that the gentle steam permeation can not be attained and the steam is released from a certain part other than the steam port may be still remained unless the seal strength in hot condition satisfies the above defined range. On the other hand, even when the seal strength in hot condition satisfies the above defined range, a great fear that the gentle steam permeation can not be attained and the steam is released from a certain part other than the steam port may be still remained unless the lamination strength in hot condition satisfies the above mentioned defined range.

Incidentally, in an embodiment where the complex film used for preparing the packaging bag further comprises other layer(s) such as an inter layer in addition to the substrate layer and the sealant layer, the defined level of the lamination strength in hot condition should be satisfied at all the interfaces between the respective layers. Separately, with respect to the defined level of the seal strength in hot condition, although it is not an absolute necessity for the seal parts other than the steam port seal part, but the main seal part may satisfy the defined level without any problems in the embodiment that the main seal part and the steam port seal part are formed at one time.

With respect to the seal strength before receiving the contents, i.e., the seal strength on the empty condition, of the packaging bag according to the present invention, for example, it would be preferable to be in the range of not less than 50 N/15 mm in width, from the viewpoint of obtaining an ample seal strength. However, it is not particularly limited thereto. Separately, at the steam port seal part, it is preferable that the seal strength on the empty condition is in the range of not more than 60 N/15 mm in width necessitated only at the steam port seal as long as it is satisfied at least at the steam port seal part. Because there is a fear that the defined seal strength in hot condition as mentioned above can not be attained when the seal strength on the empty condition become higher extremely.

With respect to the shape of the packaging bag for microwave oven heating according to the present invention itself is not particularly limited to anyone, as far as the packaging bag is manufactured by using the complex film at least one side of which comprises the sealant layer as mentioned above, folding the complex film or placing the complex films one upon another so as to encounter the sealant layers to each other, sealing the peripheral of the overlapped complex films by a main seal part so as to form a sealed bag, and preparing in the bag a region which is isolated from a space for storing contents by a steam port seal part, wherein the steam port seal part is formed consecutively from the main seal part or is formed as a part independent of the main seal part, and wherein the steam port seal part surrounds an steam easy permeable means; and satisfies the defined relation between the lamination strength in hot condition and the seal strength in hot condition as mentioned above. For instance, it may take various embodiments such as a flat bag, a self-standing bag, i.e., so called "standing pouch", and a shape, capable of heating in its lying condition, in which a steam easy permeable means is formed at a wing part which is branched from the main body of the packaging bag where the content is stored, as well as an embodiment which further comprises a casing box for storing the bag and allowing the wing part to stand so as to deviate from the main body on heating, which box has an prearranging portion capable of forming an opening, at the position that the wing part of the packaging bag installed therein is located, wherein the opening is that for pulling out the wing part to the outside of a box, and other embodiments.

Incidentally, the "steam easy permeable means" used herein is the means capable of diffusing the steam out of the bag, by being opened easily with the heat of the steam and the enhanced inner pressure generated by heating of the contents in the container before the main seal part of the packaging bag is destroyed. For example, the steam easy permeable means may be formed as at least a cut or a hollow which is provided interior the steam port seal part.

Although the steam port seal part can be formed by a seal part of which seal strength is weaker than that of the main seal part, it is preferable that the steam port seal part is formed so as to have a location or a shape to which the stress due to the heat and pressure of the steam generated by heating can be applied intensively as compared with those of the main seal part. Concretely, for instance, the steam port seal part may be formed as a portion having a comparatively small area (it is referred herein as a "point-seal part") and which is provided in a bag as distinct from peripheral edge seal part (main seal part) with which the bag is sealed to form a sealed bag. It is not limited especially as the shape of the point-seal part. The point-seal part may be the form separated from the main seal part, or may be connected with the edge seal part of the wing part.

Figure 2:
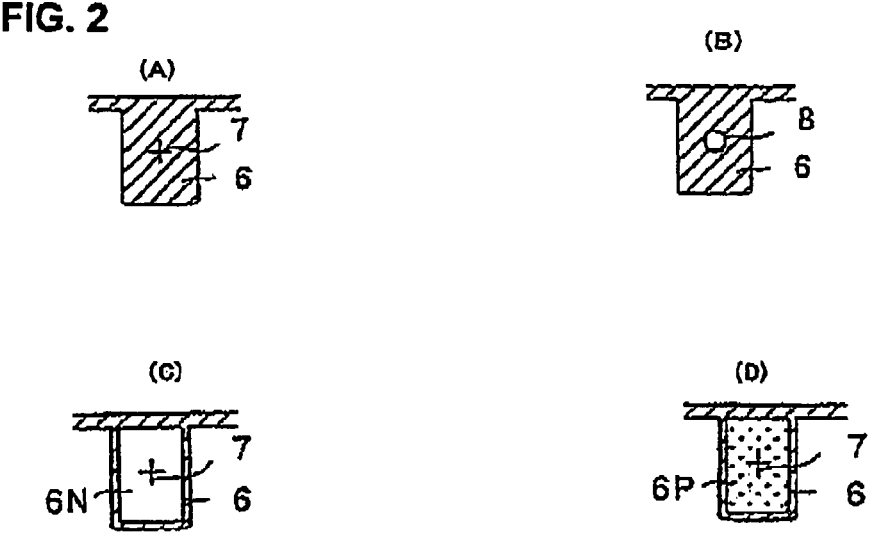
[FIG. 2] A-D are schematic diagrams for illustrating constitutional examples of the point-seal part in the packaging bag according to this invention.

The point-seal part 6 may be formed as solid seal as shown in FIG. 2A and FIG. 2B, or may be formed with surrounding an unsealed part 6N as shown in FIG. 2C, or may be formed with surrounding dotted pattern seal part 6P as shown in FIG. 2D. The shape of the point-seal part may be a square, a rectangle, a circle, an ellipse, a triangle, etc., but is not limited thereto. Further, the pattern of the pattern seal part may be mesh, stripes, lattice, dots, etc., but is not limited thereto.

Figure 3:
[FIG. 3] A-F are schematic diagrams for illustrating examples of the shape of the steam easy permeable means in the packaging bag according to this invention.
Figure 3:
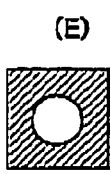
Figure 3:
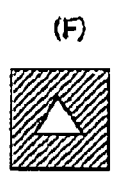

The number of cut 7 or a hollow 8 which is provided interior the point-seal part 1 is not particularly limited as far as it is not less than one, and the shapes thereof are also not limited to anywhere. For instance, cuts such as V-shape notch, U-shape notch, +-shape notch, x-shape notch as shown in FIG. 3A-FIG. 3D, and hollows such as circle, triangle as shown in FIG. 3E-FIG. 3F may be exemplified as non-limited examples.

When providing a steam easy permeable means such as cut 7 or hollow 8 inside of the point-seal part 6, on heating, the heat and pressure generated by heating can induce the exfoliation and regression of the point-seal part 6, which is followed by the natural opening of the isolated inside region of the point-seal part so as to release the steam through the steam easy permeable means 7 or 8. Thus, the breakage of the bag on heating can be prevented.

Figure 4:
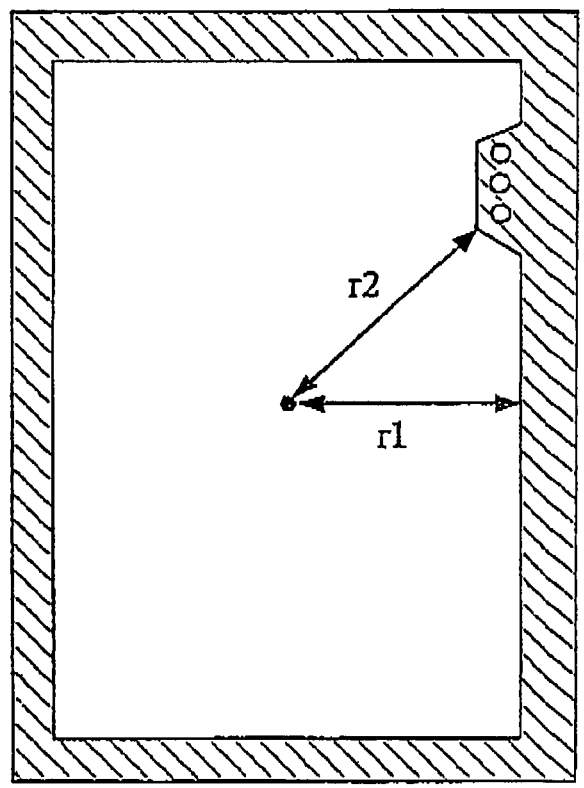
[FIG. 4] is a schematic diagram which shows an embodiment of the packaging bag according to the present invention.

Regarding the position of the point-seal part or the steam easy permeable means, it is preferable that the point-seal part is located at the position that the radius r2 of the circle which touches the lowest end of a point-seal part 6 from the center in the packaging bag is shorter than the radius r1 of the circle which touches the inner end of the side edge seal part of the bag, when circles are drawn by centering on the center of the packaging bag as shown in FIG. 4, although it is not particularly limited thereto. When the point-seal part is provided near edge of the bag, or the radius r2 is longer than the radius r1, there is a possibility that the regression of seal hardly takes place in the point-seal part because the pressure is applied insufficiently to the point-seal part on heating, and thus the natural opening of the point-seal part can not be attained.

Figure 5:
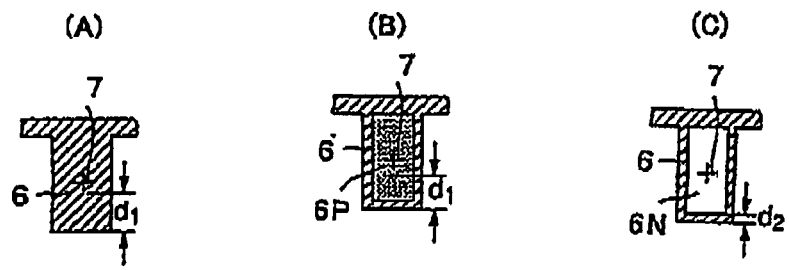
[FIG. 5] A-C are schematic diagrams for illustrating constitutional examples of the point-seal part in the packaging bag according to this invention.

Moreover, the distance d1 between the lower end of the steam easy permeable means (Figures are the examples of a cut) prepared in the point-seal part 6 and the lower end of the point-seal part 6 in the case of the solid seal type point-seal as shown in FIG. 5A-FIG. 5B and in the case of the type of having the dotted pattern seal part 6P inside of the point-seal part as shown in FIG. 2D, and the seal width d2 at the lower side of the point seal part 6 in case of the type of having the unsealed part 6N inside of the point-seal part 6 are severally desirable in the range of 2-10 mm and more particularly, in the range of 3-7 mm. When the above-mentioned distance d1 or width d2 is smaller than 2 mm, the strength to vibration, falling, etc. will become weak, and a possibility that a bag is damaged during the distribution of products will be raised. Conversely, when larger than 10 mm, a possibility that a steam penetration cannot happen easily and breakage of the bag from other seal parts will take place can be considered.

In a preferred embodiment of the packaging bag according to the present invention, the packaging bag can be formed so as to have a constitution which is manufactured by using a complex film at least one side of which comprises a sealant layer; preparing a lower member from the complex film, wherein the sealant layer is set as the upper face of the lower member; and also preparing an upper member from the complex film, wherein the upper member have a wing part which is formed by folding a part of the film so that the sealant layer of the film face each other in this part and sealing at least the side edges of the part, and wherein the sealant layer at other parts is set as the lower face of the upper member; putting the upper member on the lower member; sealing the peripheral of the overlapped members by a main seal part so as to form a sealed bag; forming at the centre region of the wing part a point-seal part as the steam port seal part in conjunction with the sealed or folded tail end edge of the wing part; and providing at least one steam easy permeable means within the point seal part.

FIGS. 6A-6E show a structural example of the preferred embodiment, which has a wing part, of the packaging bag for microwave oven heating of this invention. The packaging bag 1 for microwave oven heating according to this embodiment has a wing part 4 on one side of the main body of a bag, as shown in FIG. 6A. In the wing part 4, as shown in FIG. 6A-FIG. 6B, the point-seal part 6 and the steam easy permeable means 7 are formed. Even if a steam release port is not established beforehand on the occasion of heating, the steam generated by microwave oven heating can be diffused out from the bag through the steam permeable means 7, since exfoliation and regression of sealed area of the above-mentioned point-seal part 6 would be caused by virtue of the heat and pressure of the generated steam.

Figure 7:
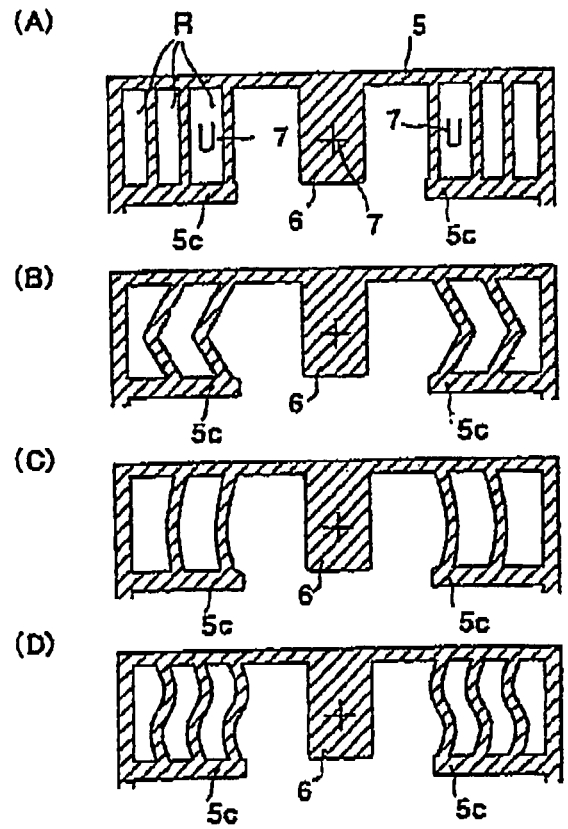
[FIG. 7] A-D are schematic diagrams for illustrating constitutional examples of the control seal part in other embodiments of packaging bag according to this invention.
Figure 8:
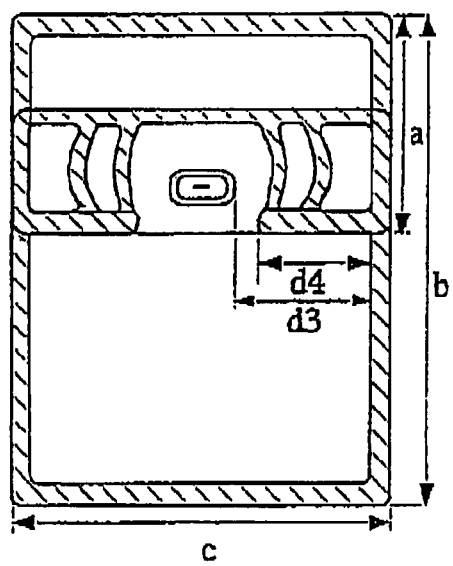
[FIG. 8] is a schematic diagram which shows another embodiment of the packaging bag according to the present invention.

The point-seal part 6, as shown in FIGS. 6A-6E and FIGS. 7A-7D, may be formed so as to be connected to the tail edge seal part of the wing part, or, as shown in FIG. 8, may be formed so as to be an isolated part in the wing part. Desirably, it is formed so as to be connected to the tail edge seal part of the wing part. Because, when the point-seal part is not connected to the tail edge seal part of the wing part, the contents generated by the microwave oven heating can pass through the pathway between the tail edge seal part and the point seal part, thus the pressure can not be applied effectively to the point-seal part, which will be followed by the failure of the smooth opening of the point-seal part, as well as the bad appearance due to the contents detention at such pathway.

The packaging bag having such wing part 4 can be heated in its horizontal configuration by which the wing part 4 is located at upper side by the microwave oven, or the like. The steam generated by microwave oven heating can migrate from the internal space of the bag main body to the internal space of wing part which is associated with the internal space of the bag main body, then, by virtue of the steam's force, the seal regression at the point-seal part will arise, which is followed by communicating the internal space of the main body part with the steam easy permeable means in the wing part. Thus, the steam generated by heating can diffuse out from the bag without bursting the bag.

Regarding the position of the point-seal part 6, it is preferable that the point-seal part 6 is located at approximately center in the width direction of the wing part as shown in FIG. 6C, and, as mentioned above, at the position that the radius r2 of the circle which touches the lowest end of a point-seal part 6 from the center in the packaging bag is shorter than the radius r1 of the circle which touches the inner end of the side edge seal part of the bag, when circles are drawn by centering on the center of the packaging bag.

With respect to the shapes and constructions of the point seal part 6, and the steam easy permeable means such as cut 7 or hollow 8, which are provided in the wing part 4, since they are similar with the above mentioned ones, the detailed explanation will be omitted.

Further, in the packaging bag for microwave oven heating of this embodiment, as a control seal part which functions for controlling properly the pressure applied to the steam easy permeable means on the microwave oven heating, as shown in FIGS. 6A-6E, control seal parts 5C are provided in the wing part so as to be extended from each side edge seal part of the wing part 4 toward the point-seal part 6 and to be arranged almost in parallel with the tail end edge of a wing part. By preparing this control seal parts 5C, the heat and pressure of steam generated by microwave oven heating can be applied intensively to the point-seal part 6, and can prevent rapid exfoliation at the point-seal part 26, and bag breakage. Thus, it is possible to perform the smooth vapor release operation.

As shown in FIG. 5C, it is preferable that the end of the control seal part 5C on the center side of the bag is located at a position between the circle which touches the lowest end 8a of the steam permeable means and the circle which touches the uppermost end 6c of the point-seal part, when coaxial circles are drawn by centering on the center of the bag, and the ratio d4/d3 of the length d4 between the side edge of the packaging bag and the center side end of the control seal part, to the length d3 between the side edge of the packaging bag and the side edge of the point-seal part, is not more than 7/8, more desirably, in the range of 7/8 to 3/8. When the control seal part 5C is extremely short, the pressure will be applied to the point-seal part 6 too much and seal regression will progress at a dash in a point-seal part on heating, and thus, leakage of content from the cut or hollow may occur, or a pop may occur, which events cause the user uneasiness. When the control seal part 5C is too long, the pressure will be not applied adequately to the point-seal part, which may result in the burst of bag.

As for the shapes of control seal parts 5C, they are desirable to be formed in axial symmetry with respect to the axis in the longitudinal direction of the bag. If they are asymmetrical, deviation will arise in the degree of pressure which applies to the control seal part 5C or the point-seal part 6, and the phenomenon may induce a possibility that automatic opening may not be attained well.

Control seal parts 5C can be made into various forms as far as it fulfills the above-mentioned conditions. For example, the control seal part is formed as solid seal. Alternatively, as shown in FIGS. 7A-7D, the upper area of control seal part is formed with a combination of seal lines each of which may be a straight line and/or a curve so as to embrace predetermined parts to form independent sealed parts R which are isolated from the internal spaces of the packaging bag. The isolated interior space of the independent sealed parts R may be in a non-seal state, or may give a pattern seal.

Furthermore, various steam permeable means may be provided in the independent seal part R. The steam permeable means may be in the same form with those in the aforesaid point-seal parts, or may be different form from those in the aforesaid point-seal parts. In an example shown in FIG. 7A, cuts 8 are provided in the independent seal parts R on both sides.

In case that the steam is generated rapidly due to the fact that the contents stored in the packaging bag has a large volume of moisture, or that the bag is subjected to heating with a high-power microwave oven, the independent seal part R will be opened in addition to the opening of the point seal part 6, and thus the steam permeable means prepared in the independent seal part R will give an effect for stabilizing the steam diffusion and steam escape from the steam easy permeable means 7 or 8 provided in the point seal part 6. Moreover, the steam permeable means in the independent seal part R functions also as a safety system when getting blocked the steam easy permeable means 7 or 8 in the point-seal part 6 with the contents, etc.

In this embodiment of this invention, with respect to the location of the wing part provided in the packaging bag 1 for microwave oven heating, it is desirable to satisfy the condition that the ratio "a/b" of the length "a" between an end edge in the longitudinal direction of the packaging bag and the formation position of the wing part, to the length "b" between the formation position of the wing part and the opposite end edge in the longitudinal direction of the packaging bag as shown in FIG. 6A is not more than 2/5. When it is within the above range, the force for promoting the exfoliation and regression by heat and enhanced internal pressure will be well applied to the point-seal part provided in the wing part, and thus, automatic opening will be better attained.

Figure 9:
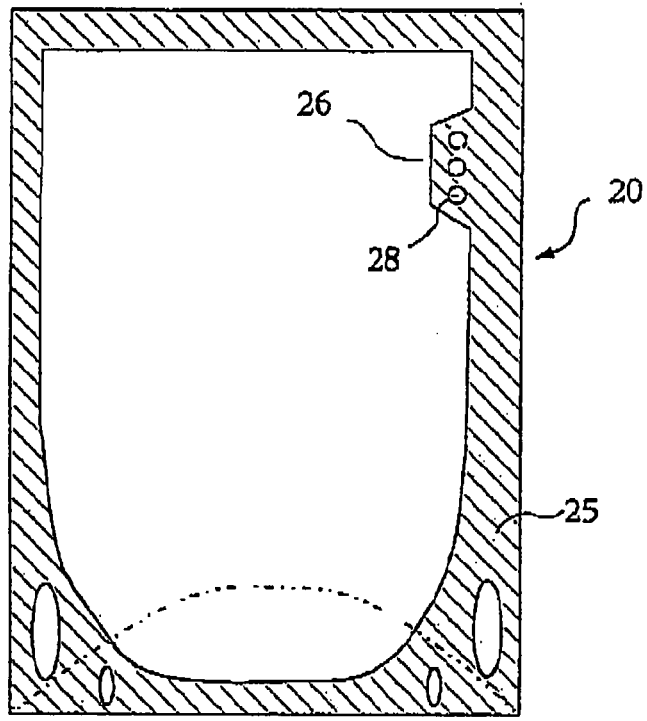
[FIG. 9] is a schematic diagram which shows a still other embodiment of the packaging bag according to the present invention.

Further, as embodiments of the packaging bag according to the present invention, for example, as shown in FIG. 9, it is possible to obtain an automatic opening type packaging bag when preparing a standing pouch 20 as shown in FIG. 9, providing a point seal part 26 at a point which is continued to the inner side of the peripheral edge seal part 25, and forming at least one steam easy permeable mean (in this figure, hollows 28) inside of the point seal part 25; or when providing a point seal part 26 in the interior region of the standing pouch which is independent of the peripheral edge seal part 25, and forming at least one steam easy permeable mean (in this figures hollows 28) inside of the point seal part. With respect to the shapes, constructions and locations of the point seal part and the steam easy permeable means in such embodiments, since they are similar with the above mentioned ones, the detailed explanation will be omitted.

Figure 6:
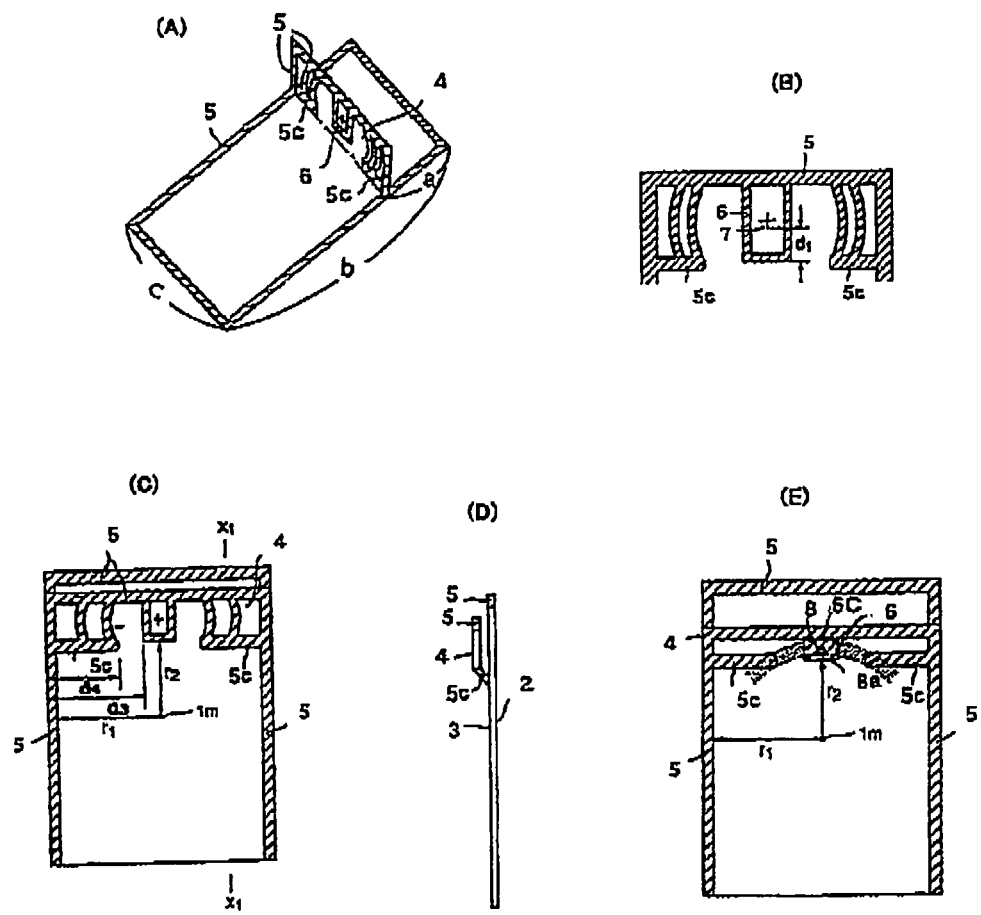
[FIG. 6] A-E are schematic diagrams which show other embodiments of the packaging bag according to the present invention.

In still another embodiment of the packaging bag according to the present invention, the packaging bag may comprise a packaging bag which has the wing part as shown in FIGS. 6-8, and a casing box for storing the bag, which box has an prearranging portion capable of forming an opening, at the position that the wing part of the packaging bag installed therein is located, wherein the opening is that for pulling out the wing part to the outside of a box.

Figure 11:
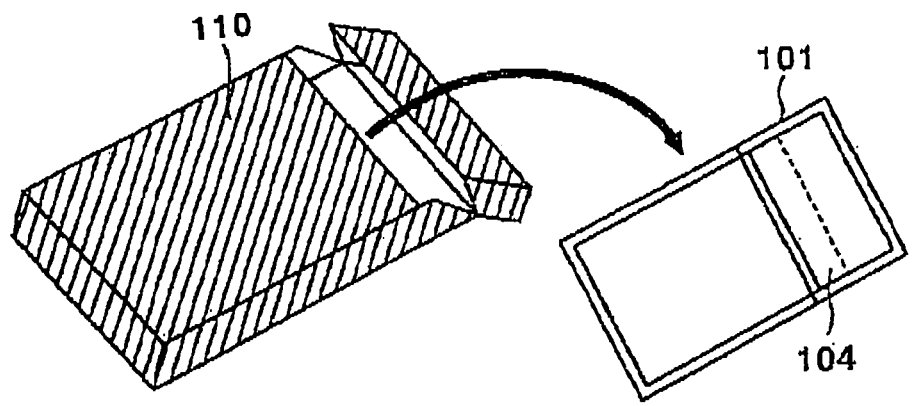
[FIG. 11] is a schematic diagram for illustrating the using method of the embodiment of the packaging bag shown in FIG. 10A and FIG. 10B.

The casing box 110 in such embodiment, for example, may be a box which has a zipper part 114 in the upper face 111 thereof, as shown in FIG. 20A. When breaking and getting rid of this zipper part 114, a slit 114S can be formed onto the upper face of the box. Further, when pulling the slit 114 in the width direction of the slit while grasping the both edges of the slit, the side faces 113 of the box are split at the cutting line part 116 provided in the side face in advance so as to take the packaging bag 101 stored therein out from the box easily, as shown in FIG. 11. The blank for fabricating such a box is as being shown in FIG. 12. In this figure, numerals 112, 114T, 115 and 117 denotes the bottom face, a zipper knob part, slitting lines, and a fold line, respectively.

When preparing the microwave oven heating, by taking the packaging bag 101 out from the casing box 110 on a temporary, putting up the wing part 104 of the bag, restoring the bag in the box, and returning the opening, the wing part 104 can protrude from the casing box, and it can hold at an upper site over the casing box as shown in FIGS. 12A and 12B.

Figure 10:
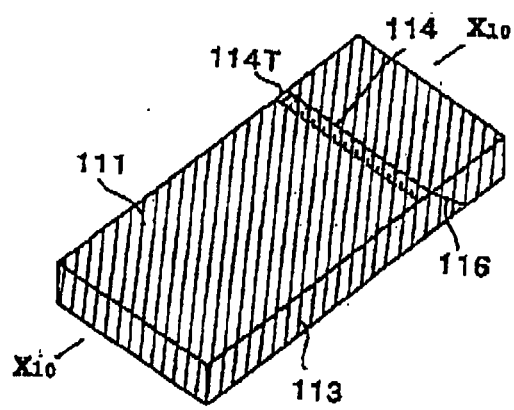
[FIG. 10] A-B are schematic diagrams which show still other embodiment of the packaging bag according to the present invention.
Figure 10:
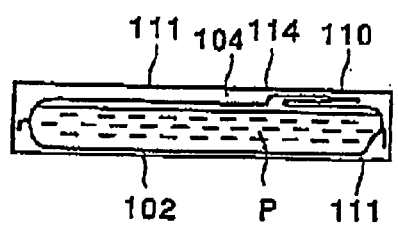
Figure 12:
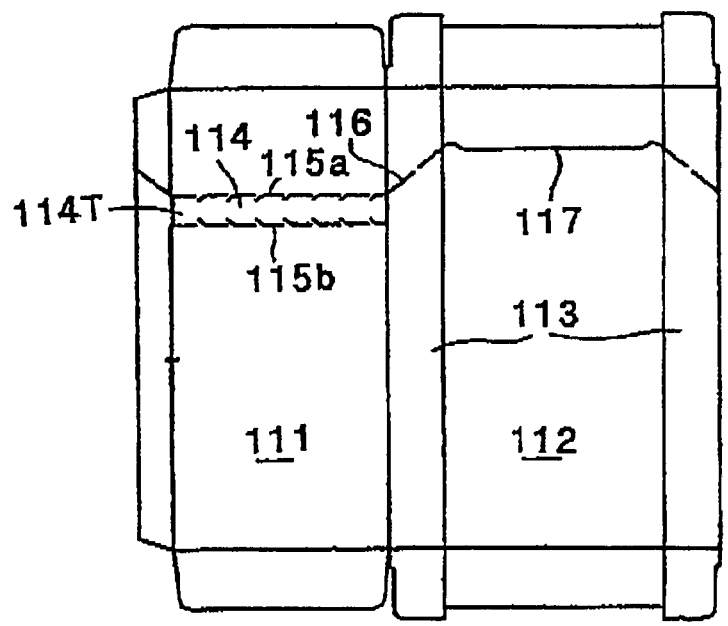
[FIG. 12] is a development of the blank of the casing box used in the packaging bag shown in FIG. 10A and FIG. 10B.
Figure 13:
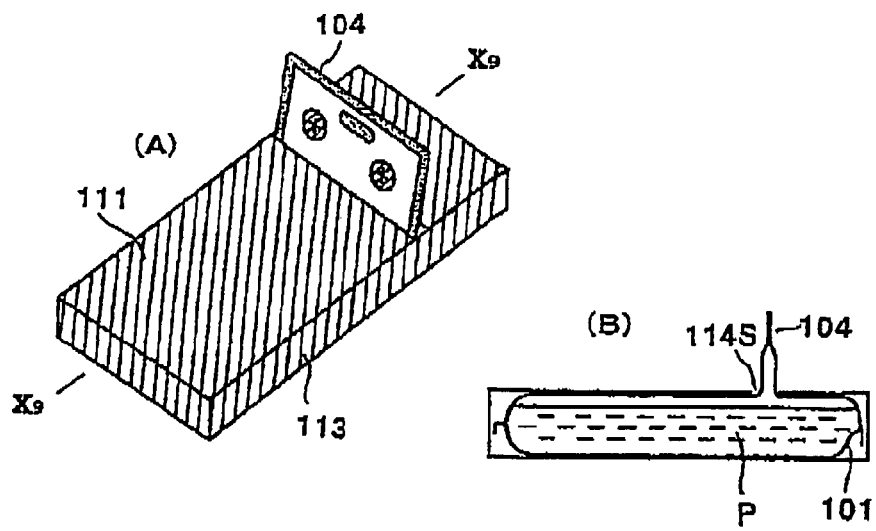
[FIG. 13] A and B are a perspective view and a sectional view, respectively, which illustrate the used state of the embodiment of the packaging bag shown in FIG. 10A and FIG. 10B.

Incidentally, the casing box is not limited to the shape of shown in FIGS. 10-12, and can take a various form, as far as it has an prearranging portion capable of forming an opening for pulling out the wing part to the outside of a box.

As the still another embodiment of the packaging bag according to the present invention, the one which is shown in FIGS. 14-17.

FIGS. 14A-14C are diagrams which show still other embodiments of the packaging bag 201 according to the present invention, wherein FIG. 14A is a perspective view, FIG. 14B is a sectional view of a layered product as a package material for manufacturing the packaging bag, and FIG. 14C is a sectional view of another layered product as a package material for manufacturing the packaging bag.

FIG. 15A is a diagram for illustrating the shape and location of the steam port seal part 209 in the packaging bag 201 according to this embodiment, and FIG. 15B is a diagram for illustrating another location of the steam port seal part 209. FIGs. 16A-16C are diagrams which show the shapes of the steam port seal part 209.

As shown in FIG. 14A, the packaging bag 201 for microwave oven heating according to this embodiment is a self-standing type packaging bag which is formed by inserting a bottom face member 204 which is folded in a reversed V-shape at a bottom region of the body part which comprises a rectangle front face member 202 and a rectangle rear face member 203, and sealing the peripheral edges of the front face member 202, the rear face member 203, and the bottom face member so as to form a top seal part 207, body seal part 205 and bottom seal part 206, and in which the bottom can be unfolded with the content Filled in the bag so as to allow the bag to stand up. Further, in the bag, a steam port seal port 209 by which a roughly polygon shaped closed loop is formed interior of the bag is formed so as to be connected to the top seal part 207 or body seal part 205, and at least one hollow 17 or cut 18 as shown in FIG. 4 is provided in the unsealed part 19 which is surrounded by the steam port seal part 209.

In the packaging bag 201 for microwave oven heating according to this embodiment, the peripheral edge seal parts, namely, the top seal part 207, body seal part 205 and bottom seal part 206 are provided for closing the bag, and the steam port seal part 209 is provided for releasing the steam on the microwave oven heating.

By such constitution, even if a cut portion is not prepared by using clipper in advance of heating, on heating, the exfoliation and regression of the steam port seal part 209 can be induced. When the exfoliation and regression reaches the unsealed part 19, the steam can release rapidly and stably from the hollow 217 or cut 218 provided in the unsealed part 19. Thus, the easy and safety auto-opening can be attained.

Further, since the packaging bag 201 for microwave oven heating according to this embodiment is the self-standing type, it is possible to heat the bag in the stood state with the microwave oven, and thus it is possible to pick up from the microwave oven easily and safely, Further, the user can take the content out from the packaging bag easily, even if the content is liquid form.

In this embodiment, it is preferable that the width of the front face member 202 and the rear face member 203 in the body part of the packaging bag 201 is equal to or longer than the height of these members. When this condition is satisfied, even when the packaging bag 201 is set on the tray of the microwave oven in its stood condition, there is little fear that the packaging bag 201 falls down or moves during the rotation of the tray, and it is possible to heat stably.

In the packaging bag 201 for microwave oven heating according to this embodiment, since the steam port seal port 209 by which a roughly polygon shaped closed loop is formed interior of the bag is formed so as to be connected to the top seal part 207 or body seal part 205, when heating with the microwave oven, the pressure generated can apply intensively to the steam port seal port 209. Thus, the seal exfoliation from the edge of the steam port seal part 209 can be rapidly caused, and thereby, the steam can release rapidly from the hollow 217 provided in the unsealed part 219. Further, there is an advantage that the steam port seal port 209 can be formed concurrently with the body seal part 205 or the top seal part 207, which contributes to the improvement of the productivity.

When the steam port seal port 209 is connected to neither the top seal part 207 nor the body seal part 205, and thus it is independent of these seal parts 205 and 207, the steam generated by the microwave oven heating can pass through the pathway between the body seal part 205 or the top seal part 207 and the independent steam port seal part 209, thus the pressure can not be applied effectively to the independent steam port seal part, which will be followed by the failure of the smooth opening of the independent steam port seal part. Thus, it is not preferable. Further, the content detention at the pathway between the body seal part 205 or the top seal part 207 and the independent steam port seal part 209 may be caused during the content filling process or during the transportation of the products, which will be followed by the bad appearance. Further, since the independent steam port seal part 209 should be formed in a step separated from the step for the body seal part 205 or the top seal part 207, it is also not preferable from the view point of the productivity.

Further, since the unsealed part 19 surrounded by the steam port seal part 209 is formed, the sealed width reached the cut or hollow to be exfoliated or regressed can keep at a constant level even when some deviation would be occurred on the formation of the cut or hollow. And when the exfoliation or regression reaches the unsealed part 19, the hollow 217 or cut 218 provided in the unsealed part 19 can be opened at a dash. Thus, there is an advantage that the steam releasing on the microwave oven heating can be accomplished stably and rapidly with a certainty.

In the case that the unsealed part 19 surrounded by the steam port seal part 209 is not formed, and the solid seal is formed thereto, the sealed width reached the cut or hollow to be exfoliated or regressed is varied when some deviation would be occurred on the formation of the cut or hollow. As the results, the stable seal exfoliation can not be attained. Thus, it is not preferable.

Further since the hollow 217 or cut 218 is located inside of the region surrounded by the steam port seal part 209 and the body seal part 205 or the top seal part 207, it is possible to keep the perfect sealing performance during the transportation of the product, and thus it is sanitary.

The layered product (complex film) 210 which is used for manufacturing the packaging bag according to this embodiment is not particularly limited as far as it has at least a substrate layer and a sealant layer and it satisfies the above defined relation between the lamination strength in hot condition and the seal strength in hot condition. For instance, as shown in FIG. 14C, the layered product may comprise a substrate layer 212, a printed layer 211, an adhesive agent layer 213, and a sealant layer 215, which are layered in that order.

As shown in FIG. 14C, if necessary, it may provide an inter layer 214 between the substrate layer 212 and the sealant layer 215.

Incidentally, the printed layer 211 and the adhesive agent layer 213 are not essential layers, and are optionally provided in accordance with the requirement.

Regarding the position of the steam port seal part 209, as shown in FIG. 15A, it is preferable that the steam port seal part 209 is located at the position that the radius r2 of the circle which touches the lowest end of the steam port seal part 209 from the center in the packaging bag is shorter than the radius r1A of the circle which touches the inner end of the body seal part 205 of the bag, and the radius r1B of the circle which touches the inner end of the top seal part 205 of the bag, when circles are drawn by centering on the center of the packaging bag.

When the radius r2 is longer than the radius r1A or the radius r1B, there is a possibility that the exfoliation and regression of seal takes place at the body seal part 205 or the top seal part 207, and thus the content in the package leaks out from the thus broken package. Therefore, it is not preferable.

Similarly in the embodiment shown in FIG. 15B, it is preferable that the steam port seal part 209 is located at the position that the radius r2 of the circle which touches the lowest end of the steam port seal part 209 from the center in the packaging bag is shorter than the radius r1A of the circle which touches the inner end of the body seal part 205 of the bag, and the radius r1B of the circle which touches the inner end of the top seal part 205 of the bag, when circles are drawn by centering on the center of the packaging bag.

With respect to the shape of the steam port seal part, as shown in FIGS. 16A-16C, it is preferable that the lowest end edge of the steam port seal part protrudes so as to form a tip 220. As far as the tip 220 is formed, the shape of the steam port seal part is not limited to the rectangle shape, and it may be, for example, trapezoid shape, or triangle shape.

With such shape, the internal pressure by heating can be applied to intensively to the tip 220. Thus, starting from the tip 220, the exfoliation and regression of seal can progress certainly, smoothly and safely. Therefore it is preferable.

On the other hand, when the shape of the steam port seal part 209 does not include tip and is a circular or semicircular shape, the internal pressure by heating is applied dispersively, and thus the larger pressure would be needed to cause the exfoliation and regression of seal. Therefore, the exfoliation of seal does not proceed smoothly and the larger pressure would be applied to the parts other than the steam port seal part 209. Thus, it is not preferable.

With respect to the seal width at the steam port seal part, it is preferable to be in the range of about 2 mm-about 5 mm, because in such range the exfoliation of seal can proceed smoothly with the internal pressure produced by heating.

When the seal width at the steam port seal part is not less than 2 mm, the seal strength may be unstable and thus it is not preferable. When it exceeds 5 mm, the exfoliation of seal would not proceed smoothly with the internal pressure produced by heating, and thus it is not preferable.

With respect to the seal width at the peripheral edge part, namely, at the body seal part 205, the bottom seal part 206, ant top seal part 207, in the packaging bag for the microwave oven heating in the embodiment shown in FIG. 14A, it is preferable to be in the range of about 5 mm-about 20 mm, because in such range the breakage of the bag is hardly occurred by pressure or impacted force caused during the transportation and storage.

Incidentally, with respect to the steam easy permeable means such as hollow 217 or cut 218 formed inside of the steam port seal part 209, since they are similar with the ones explained in FIGS. 3A-3F as above mentioned, the detailed explanation will be omitted.

EXAMPLES

This invention is hereafter explained more concretely based on the following examples. The following examples are, however, given only for the purpose for making the understanding of this invention easy, and do not limit this invention at all.

Examples 1-5 and Controls 1-2

A complex film was manufactured by dry lamination of a 12 μm oriented polyethylene terephthalate film, a 15μm biaxially oriented nylon film, and a 60 μm non-oriented polypropylene film, with using a two liquid type urethane type adhesive agent, so as to form the complex film of the type of PET 12/ONy 15/CPP60. Then, the pouch of the shape as shown in FIG. 9 was prepared by using the complex film. Incidentally, the composition of the respective layer composing the complex film, composition of the adhesive agent, condition for dry lamination, and the seal condition were varied in the respective Examples and Controls.

Water 200 g was injected into the obtained pouch, and after sealing, the pouch was subjected to a retort treatment at 125° C. for 30 minutes.

One day after the retort treatment, rectangle samples of 15 mm in width were cut out from the seal part of the pouch. Then the sample was set to the chuck of a peeling tester (autograph) so as to be capable of exfoliating the sealed faces of the sample from each other, then the sample was heated in this chucked condition. 30 minutes after the environmental temperature reaches 100° C., the peel-off test was started with an elastic stress rate of 300 mm/min. in order to determine the seal strength in hot condition (numbers of sample n=10, per each Example or Control).

Separately, the sample obtained as above was set to the chuck of a peeling tester (autograph) so as to be capable of exfoliating the respective layers in the complex film of the sample from each other, then the sample was heated in this chucked condition. 30 minutes after the environmental temperature reaches 100° C., the peel-off test was started with an elastic stress rate of 50 mm/min. in order to determine the laminate strength in hot condition (numbers of sample n=10, per each Example or Control).

The seal strength in hot condition and the laminate strength in hot condition thus determined for the respective Examples and Controls are shown in Table 1.

Further, apart from the ones for determining the seal strength in hot condition and the lamination strength in hot condition, the obtained pouch after retort treatment (numbers of sample n=10, per each Example or Control) was subjected to heating with a microwave oven of 1600 W power for 1 minute. As the result, the number of pouches in which the steam port can be created normally and the heating can be completed normally is shown in Table 1.

TABLE 1

|  | Ex. 1 | Ex. 2 | Ex. 3 | Ex. 4 | Ex. 5 | Ctrl. 1 | Ctrl. 2 |
|---|---|---|---|---|---|---|---|
| Seal strength in hot condition (N/15 mm) | 28 | 5 | 13 | 5 | 28 | 29 | 28 |
| Lamination strength in hot condition (N/15 mm) | 1.5 | 3.0 | 1.7 | 1.5 | 2.8 | 1.5 | 1.4 |
| Number of samples normally oven heated | 10/10 | 10/10 | 10/10 | 10/10 | 10/10 | 8/10 | 9/10 |

As shown in Table 1, it is possible to perform good microwave oven heating in all of the packaging bags in Examples according to the present invention.

Examples 6-10 and Controls 3-4

(1) First, a 12 μm oriented polyethylene terephthalate was set to a feeding roll of a plasma chemical vapor deposition apparatus, and a silicon oxide vapor deposition film of 200 Å in thickness was formed on a corona treated surface of the oriented polyethylene terephthalate under the following condition.
(Deposition Condition)
Surface to be deposited: corona treated surface
Amount of introduced gas: hexamethyl disiloxane:oxygen gas:helium=1.0:3.0:3.0 (Unit: slm)
Vacuum degree in vacuum chamber: $2-6\times10^{-6}$ mbar
Vacuum degree in deposition chamber: $2-5\times10^{-3}$ mbar
Supplied power of cool/electrode drum: 10 kW
Line speed: 100 m/min
(2) Next, a complex film was manufactured by dry lamination of a 12 μm silica deposited oriented polyethylene terephthalate film obtained as above, a 15 μm biaxially oriented nylon film, and a 60 μm non-oriented polypropylene film, with using a two liquid type urethane type adhesive agent, so as to form the complex film of the type of silica deposited PET 12/ONy 15/CPP60. Then, the pouch of the shape as shown in FIG. 9 was prepared by using the complex film. Incidentally, the composition of the respective layer composing the complex film, composition of the adhesive agent, condition for dry lamination, and the seal condition were varied in the respective Examples and Controls.

Water 200 g was injected into the obtained pouch, and after sealing, the pouch was subjected to a retort treatment at 125° C. for 30 minutes.

One day after the retort treatment, rectangle samples of 15 mm in width were cut out from the seal part of the pouch. Then the sample was set to the chuck of a peeling tester (autograph) so as to be capable of exfoliating the sealed faces of the sample from each other, then the sample was heated in this chucked condition. 30 minutes after the environmental temperature reaches 100° C., the peel-off test was started with an elastic stress rate of 300 mm/min. in order to determine the seal strength in hot condition (numbers of sample n=10, per each Example or Control).

Separately, the sample obtained as above was set to the chuck of a peeling tester (autograph) so as to be capable of exfoliating the respective layers in the complex film of the sample from each other, then the sample was heated in this chucked condition. 30 minutes after the environmental temperature reaches 100° C., the peel-off test was started with an elastic stress rate of 50 mm/min. in order to determine the laminate strength in hot condition (numbers of sample n=10, per each Example or Control).

The seal strength in hot condition and the laminate strength in hot condition thus determined for the respective Examples and Controls are shown in Table 2.

Further, apart from the ones for determining the seal strength in hot condition and the lamination strength in hot condition, the obtained pouch after retort treatment (numbers of sample n=10, per each Example or Control) was subjected to heating with a microwave oven of 1600 W power for 1 minute. As the result, the number of pouches in which the steam port can be created normally and the heating can be completed normally is shown in Table 2.

TABLE 2

|  | Ex. 6 | Ex. 7 | EX. 8 | Ex. 9 | Ex. 10 | Ctrl. 3 | Ctrl. 4 |
|---|---|---|---|---|---|---|---|
| Seal strength in hot condition (N/15 mm) | 28 | 5 | 10 | 15 | 28 | 29 | 28 |
| Lamination strength in hot condition (N/15 mm) | 1.5 | 2.5 | 1.8 | 1.5 | 3.0 | 1.5 | 1.4 |
| Number of samples normally oven heated | 10/10 | 10/10 | 10/10 | 10/10 | 10/10 | 8/10 | 8/10 |

As shown in Table 2, it is possible to perform good microwave oven heating in all of the packaging bags in Examples according to the present invention.

Examples 11-15 and Controls 5-6

(1) First, onto a 12 μm oriented polyethylene terephthalate, a silicon oxide vapor deposition film of 200 Å in thickness was formed under the same condition as shown in Examples 6-10.

Then, immediately after the silicon oxide vapor deposition film of 200 Å in thickness was formed, an oxygen/argon mixed gas plasma treatment was applied on the surface of the silicon oxide vapor deposition film, by using a glow discharge plasma generator at power of 9 kw, with a mixed gas which consists of oxygen gas and argon in the rate of oxygen gas $(O_2)$: argon gas $(Ar)$=7.0:2.5 (Unit: slm), and under the mixed gas pressure of $6\times10^{-5}$ Torr. Thereby, a plasma treated surface where the surface tension of the silicon oxide vapor deposition film was enhanced to 54 dyne/cm or more.
(2) Separately, in accordance with the composition shown in the following Table 3, a clear color less barrier coating solution was prepared by adding (Composition b.) a hydrolyzed solution which was prepared in advance and which consisted of ethyl silicate 40, isopropyl alcohol, acetyl acetone aluminum and ion exchanged water, to (Composition a.) an EVOH solution where EVOH (copolymerized ethylene ratio: 29%) was dissolved with a mixture solvent of isopropyl alcohol and ion exchanged water, with stirring, and then further adding (Composition c.) a mixed solution which consisted of poly vinyl alcohol solution, acetic acid, isopropyl alcohol and ion exchanged water, with stirring.

TABLE 3

| a | EVOH (copolymerized ethylene ratio: 29%) | 0.122 (wt. %) |
|---|---|---|
|   | Isopropyl alcohol | 0.659 |
|   | H2O | 0.439 |
| b | Ethyl silicate 40 | 9.146 |
|   | Isopropyl alcohol | 8.780 |
|   | Aluminum acetyl acetone | 0.018 |
|   | H2O | 6.291 |
| c | Polyvinyl alcohol | 1.220 |
|   | Isopropyl alcohol | 19.893 |
|   | H2O | 43.329 |
|   | Acetic acid | 0.103 |
|   | Total | 100.000 (wt. %) |

Next, onto the plasma treated surface prepared in above step (1), the above gas barrier composition was coated according to the gravure coating method, then the coated surface was heated at 100° C. for 30 minutes, in order to obtain a gas barrier coated film of 0.4 g/m² (in dried condition) in thickness.

Figure 14:
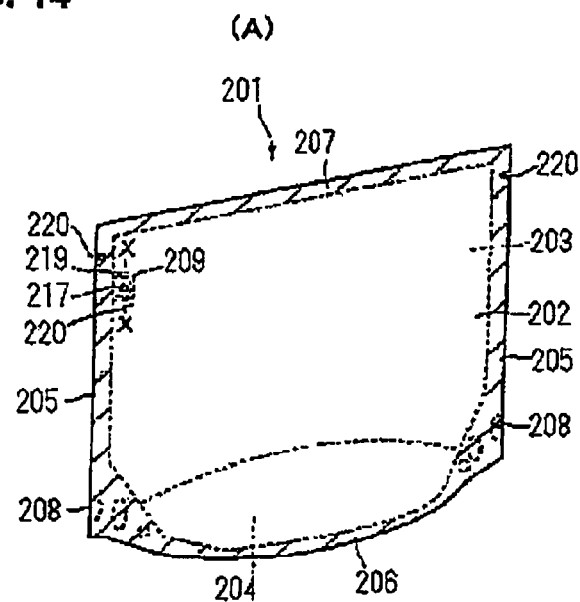
[FIG. 14] are diagrams which show still other embodiments of the packaging bag according to the present invention, wherein A is a perspective view, B is a sectional view of a layered product as a package material for manufacturing the packaging bag, and C is a sectional view of another layered product as a package material for manufacturing the packaging bag.
Figure 14:
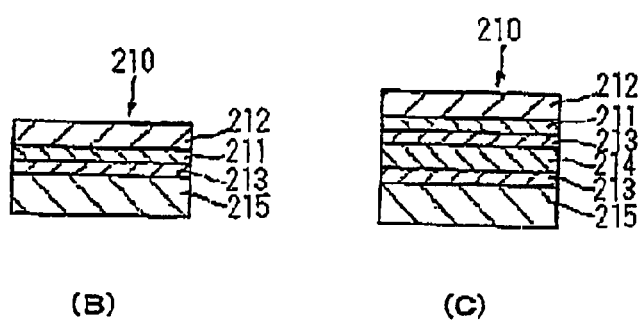
Figure 15:
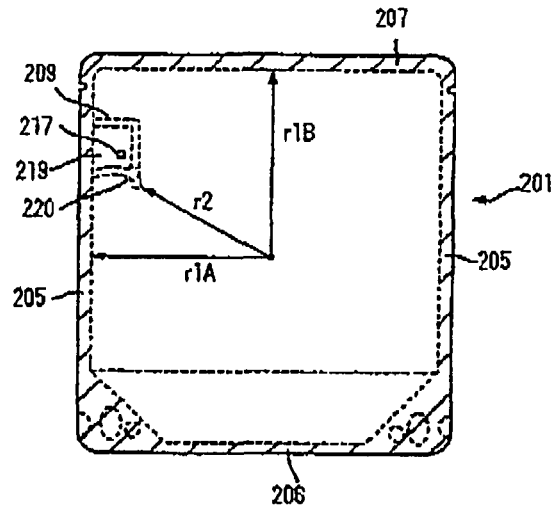
[FIG. 15] A is a diagram for illustrating the shape and location of the steam port seal part in the packaging bag according to the embodiment shown in FIG. 14A, and B is a diagram for illustrating another location of the steam port seal part in the packaging bag according to the embodiment shown in FIG. 14A.
Figure 15:
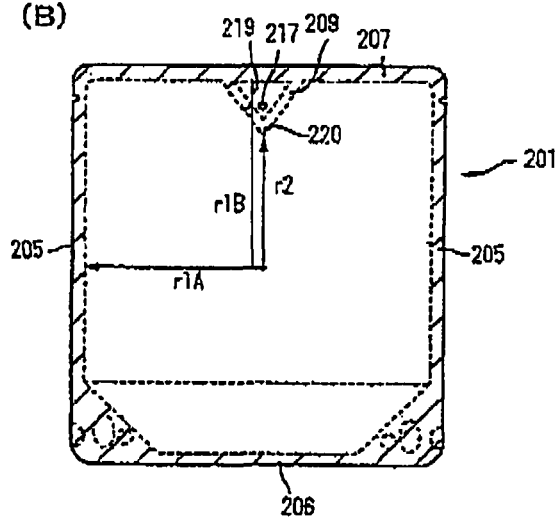
Figure 16:
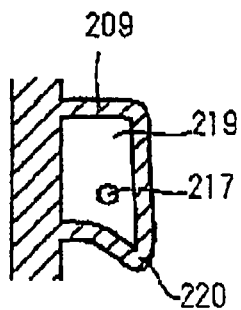
[FIG. 16] A-C are sectional views which show other examples of the shape of the steam port seal part.
Figure 16:
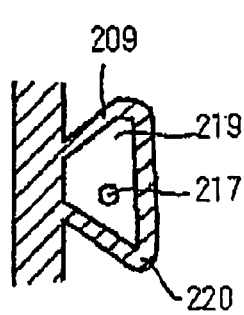
Figure 16:
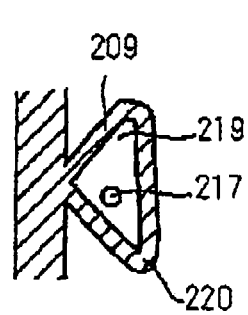

(3) Then, onto the gas barrier coated film formed in the above step (2), a desired printed design was formed. Thereafter, onto the entire surface including the printed design part, a two liquid type urethane type adhesive agent was coated. Next, onto the adhesive agent layer, a 15 μm biaxially oriented nylon film was stacked, then the dry lamination was performed. Further, onto the biaxially oriented nylon film, an adhesive agent layer was formed by the same procedure as above. Onto this adhesive agent layer, a 60 μm non-oriented polypropylene film was stacked, then the dry lamination was performed. Thereby, the complex film of the type of gas barrier layer coated silica deposited PET 12/ONy 15/CPP60 was manufactured. Then, a pouch of the shape as shown in FIG. 14 was prepared by using the complex film. Incidentally, the composition of the respective layer composing the complex film, composition of the adhesive agent, condition for dry lamination, and the seal condition were varied in the respective Examples and Controls.

Water 200 g was injected into the obtained pouch, and after sealing, the pouch was subjected to a retort treatment at 125° C. for 30 minutes.

One day after the retort treatment, rectangle samples of 15 mm in width were cut out from the seal part of the pouch. Then the sample was set to the chuck of a peeling tester (autograph) so as to be capable of exfoliating the sealed faces of the sample from each other, then the sample was heated in this chucked condition. 30 minutes after the environmental temperature reaches 100° C., the peel-off test was started with an elastic stress rate of 300 mm/min. in order to determine the seal strength in hot condition (numbers of sample n=10, per each Example or Control).

Separately, the sample obtained as above was set to the chuck of a peeling tester (autograph) so as to be capable of exfoliating the respective layers in the complex film of the sample from each other, then the sample was heated in this chucked condition. 30 minutes after the environmental temperature reaches 100° C., the peel-off test was started with an elastic stress rate of 50 mm/min. in order to determine the laminate strength in hot condition (numbers of sample n=10, per each Example or Control).

The seal strength in hot condition and the laminate strength in hot condition thus determined for the respective Examples and Controls are shown in Table 4.

Further, apart from the ones for determining the seal strength in hot condition and the lamination strength in hot condition, the obtained pouch after retort treatment (numbers of sample n=10, per each Example or Control) was subjected to heating with a microwave oven of 1600 W power for 1 minute. As the result, the number of pouches in which the steam port can be created normally and the heating can be completed normally is shown in Table 4.

TABLE 4

|   | Ex. 11 | Ex. 12 | Ex. 13 | Ex. 14 | Ex. 15 | Ctrl. 5 | Ctrl. 6 |
|---|---|---|---|---|---|---|---|
| Seal strength in hot condition (N/15 mm) | 28 | 5 | 11 | 14 | 28 | 29 | 28 |
| Lamination strength in hot condition (N/15 mm) | 1.5 | 2.9 | 1.9 | 1.5 | 2.9 | 1.5 | 1.4 |
| Number of samples normally oven heated | 10/10 | 10/10 | 10/10 | 10/10 | 10/10 | 8/10 | 8/10 |

As shown in Table 4, it is possible to perform good microwave oven heating in all of the packaging bags in Examples according to the present invention.

Examples 16-20 and Controls 7-8

(1) First, onto a 12 μm oriented polyethylene terephthalate, a silicon oxide vapor deposition film of 200 Å in thickness was formed under the same condition as shown in Examples 11-15.

(2) Separately, in accordance with the composition shown in the following Table 5, a clear color less barrier coating solution was prepared by adding (Composition a.) a hydrolyzed solution which was prepared in advance and which consisted of ethyl silicate (tetraethoxy silane), ethanol, 2N hydrochloric acid, ion exchanged water and silane coupling agent (Epoxy Silica SH6040), to (Composition b.) a mixed solution which consisted of polyvinyl alcohol, 32 wt. % ethanol solution of N,N-dimethyl benzyl amine, and ion exchanged water, with stirring.

TABLE 5

| a | Ethyl silicate 40 | 34.074 (wt. %) |
|---|---|---|
|   | Ethanol | 34.074 |
|   | 2N hydrochloric acid | 2.535 |
|   | H2O | 2.058 |
|   | Silane coupling agent | 3.407 |
| b | Polyvinyl alcohol | 2.372 |
|   | H2O | 21.344 |
|   | Ethanol solution of N,N-dimethyl benzyl amine (32 wt. %) | 0.136 |
|   | Total | 100.000 (wt. %) |

Next, onto the plasma treated surface prepared in above step (1), the above gas barrier composition was coated according to the gravure coating method, then the coated surface was heated at 100° C. for 30 minutes, in order to obtain a gas barrier coated film of 0.4 g/m² (in dried condition) in thickness.

(3) Then, onto the gas barrier coated film formed in the above step (2), a desired printed design was formed. Thereafter, onto the entire surface including the printed design part, a two liquid type urethane type adhesive agent was coated. Next, onto the adhesive agent layer, a 60 μm non-oriented polypropylene film was stacked, then the dry lamination was performed. Thereby, the complex film of the type of gas barrier layer coated silica deposited PET 12/ONy 15/CPP60 was manufactured. Then, a pouch of the shape as shown in FIG. 14 was prepared by using the complex film. Incidentally, the composition of the respective layer composing the complex film, composition of the adhesive agent, condition for dry lamination, and the seal condition were varied in the respective Examples and Controls.

Then, as the same procedure as in Examples 11-15, the seal strength in hot condition and the lamination strength in hot condition was determined after water was charged into the obtained pouch and the retort treatment was performed As the results, the seal strength in hot condition and the lamination strength in hot condition of Examples 16-20 were similar with those of Examples 11-15, respectively. The seal strength in hot condition and the lamination strength in hot condition of Controls 7-8 were similar with those of Controls 5-6, respectively.

Further, apart from the ones for determining the seal strength in hot condition and the lamination strength in hot condition, the obtained pouch after retort treatment (numbers of sample n=10, per each Example or Control) was subjected to heating with a microwave oven of 1600 W power for 1 minute. As the result, it was possible to perform good microwave oven heating in all of the packaging bags in Examples according to the present invention (number of samples normally oven heated: 10/10), while in some samples of Controls, the steam port can not created normally, and breakages of the pouch were observed.

The invention claimed is:

1. A packaging bag for microwave oven heating:
which is manufactured by using a complex film at least one side of which comprises a sealant layer, folding the complex film or placing the complex film upon another same complex film so as to encounter the sealant layer of the folded complex film or the sealant layers of the complex film and the another complex film to each other, sealing the peripheral of overlapped parts of the complex film or the peripheral of overlapped complex films by a main seal part to form a sealed bag, and providing in the bag a region which is isolated from a space for storing contents by a steam port seal part,
wherein the steam port seal part is formed consecutively from the main seal part or is formed as a part independent of the main seal part, and
wherein the steam port seal part surrounds a steam easy permeable means, wherein the lamination strength between the layers of the complex film in hot condition is in the range of 1.5 N/15 mm in width to 5 N/15 mm in width or at the level of the material destruction of the film, and the seal strength at least at the steam port seal part in hot condition is in the range of 5 N/15 mm in width to 28 N/15 mm in width.

2. The packaging bag according to claim 1,
wherein the bag is manufactured by using the complex film at least one side of which comprises the sealant layer; preparing a lower member from the complex film, wherein the sealant layer is set as an upper face of the lower member; and also preparing an upper member from the complex film, wherein the upper member has a wing part which is formed by folding a part of the complex film so that the sealant layer of the folded part of the complex film faces each other and sealing at least side edges of the folded part, and wherein the sealant layer at parts other than the folded part is set as a lower face of the upper member; putting the upper member on the lower member; sealing the peripheral of the overlapped members by the main seal part to form the sealed bag; forming at a centre region of the wing part a point-seal part as the steam port seal part in conjunction with the sealed or folded tail end edge of the wing part; and providing at least one of the steam easy permeable means within the point seal part.

3. The packaging bag according to claim 2,
wherein control seal parts are provided almost in parallel with the tail end edge of the wing part and toward the point-seal part from both side edge seal parts of the wing part.

4. The bag according to claim 2,
wherein the packaging bag further comprises a casing box for storing the bag, which box has an prearranging portion capable of forming an opening, at the position that the wing part of the packaging bag installed therein is located, wherein the opening is that for pulling out the wing part to the outside of a box.

5. The bag according to claim 1,
wherein the bag has a self-standing shape.

6. The packaging bag according to claim 1,
wherein the complex film comprises at least the sealant layer and a substrate layer, and wherein the substrate layer further comprises an inorganic oxide vapor deposition layer on the surface faced to the sealant layer.

7. The packaging bag according to claim 6,
wherein the inorganic oxide vapor deposition layer further has a gas barrier film on the surface faced to the sealant layer, wherein the gas barrier film is formed by coating a gas barrier composition which comprises at least one alkoxide represented by the following general formula:

$$R^1{}_n M(OR^2)_m$$

(wherein R1 and R2 are mutually independently an organic group having 1-8 carbon atoms, M is a metallic atom, n is an integer of not less than zero, m is an integer of not less than one, and m+n represents the valence of the M.);
and a polyvinyl alcohol type resin and/or an ethylene-vinyl alcohol copolymer, and which can polycondense according to the sol-gel method under the pressure of a catalyst for the sol-gel method, an acid, water, and an organic solvent; and allowing the composition to polycondense.

8. The packaging bag according to claim 6,
wherein the inorganic oxide vapor deposition layer further comprises a primer layer on the surface faced to the sealant layer, wherein the primer layer is formed by coating a polyurethane or polyester type resin composition which comprises polyurethane or polyester type resin as a main vehicle ingredient and a silane coupling agent at an amount of 0.05- 10% by weight based on an amount of 1-30% by weight of the polyurethane or polyester type resin, and drying up the coated film.

9. The bag according to claim 3,
wherein the packaging bag further comprises a casing box for storing the bag, which box has an prearranging portion capable of forming an opening, at the position that the wing part of the packaging bag installed therein is located, wherein the opening is that for pulling out the wing part to the outside of a box.

* * * * *

UNITED STATES PATENT AND TRADEMARK OFFICE
CERTIFICATE OF CORRECTION

PATENT NO. : 8,434,637 B2  Page 1 of 1
APPLICATION NO. : 11/887825
DATED : May 7, 2013
INVENTOR(S) : Mita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1525 days.

Signed and Sealed this
Eighth Day of September, 2015

Michelle K. Lee
*Director of the United States Patent and Trademark Office*